United States Patent
Sasaki et al.

(10) Patent No.: US 6,563,681 B1
(45) Date of Patent: May 13, 2003

(54) MAGNETORESISTANCE EFFECT FILM AND MAGNETORESISTANCE EFFECT TYPE HEAD

(75) Inventors: Tetsuro Sasaki, Tokyo (JP); Koichi Terunuma, Tokyo (JP); Hiroaki Kawashima, Tokyo (JP); Noriyuki Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/542,912

(22) Filed: Apr. 4, 2000

(30) Foreign Application Priority Data

May 31, 1999 (JP) .......................................... 11-151541

(51) Int. Cl.[7] .................................................. G11B 5/39
(52) U.S. Cl. .................................. 360/324.12; 360/113
(58) Field of Search .......................... 360/113, 324.12, 360/324.11, 324.1, 313, 126; 428/611, 615, 661, 692, 693, 697; 29/29.603

(56) References Cited

U.S. PATENT DOCUMENTS

| | | | | | |
|---|---|---|---|---|---|
| 5,493,465 | A | * | 2/1996 | Kamiguchi et al. | 360/113 |
| 5,729,409 | A | * | 3/1998 | Ohashi et al. | 360/113 |
| 5,739,988 | A | * | 4/1998 | Gill | 360/113 |
| 5,856,897 | A | * | 1/1999 | Mauri | 360/113 |
| 5,896,252 | A | * | 4/1999 | Kanai | 360/113 |
| 5,914,597 | A | * | 6/1999 | Fujii et al. | 324/252 |
| 5,936,812 | A | * | 8/1999 | Terunuma et al. | 360/113 |
| 6,090,498 | A | * | 7/2000 | Omata et al. | 428/692 |
| 6,118,624 | A | * | 9/2000 | Fukuzawa et al. | 360/113 |
| 6,129,957 | A | * | 10/2000 | Xiao et al. | 427/548 |
| 6,137,662 | A | * | 10/2000 | Huai et al. | 360/327.22 |
| 6,154,349 | A | * | 11/2000 | Kanai et al. | 360/324.12 |
| 6,278,592 | B1 | * | 8/2001 | Xue et al. | 360/324.12 |
| 6,287,709 | B1 | * | 9/2001 | Mizuguchi | 428/611 |

\* cited by examiner

*Primary Examiner*—Robert S. Tupper
*Assistant Examiner*—Dzung C. Nguyen
(74) *Attorney, Agent, or Firm*—Oblon, Spivak, McClelland, Maier & Neustadt, P.C.

(57) ABSTRACT

A soft magnetic layer constituting a spin valve type magnetoresistance effect film comprises a multilayered body having at least two layers and including a first soft magnetic layer substantially made of Co or CoFe, and a second soft magnetic layer substantially made of NiFeX (wherein X represents at least one selected from Ta and Nb) in the order named from the side of a non-magnetic metal layer. More preferably, the soft magnetic layer comprises a multilayered body having at least three layers and including a first soft magnetic layer substantially made of Co or CoFe, a third soft magnetic layer substantially made of NiFe, and a second soft magnetic layer substantially made of NiFeX (wherein X represents at least one selected from Ta and Nb) in the order named from the side of the non-magnetic metal layer. Therefore, the detection sensitivity of a magnetic signal and the output of the magnetic head can be improved. Further, the linearity of the derived signal is also excellent.

34 Claims, 14 Drawing Sheets

Applied Magnetic Field

MAGNETORESISTANCE EFFECT FILM AND MAGNETORESISTANCE EFFECT TYPE HEAD

BACKGROUND OF THE INVENTION

1. Field of the Invention

The present invention relates to a magnetoresistance effect film for reading the magnetic field intensity of a magnetic recording medium or the like as a signal and, in particular, to a magnetoresistance effect film which is capable of reading a small magnetic field change as a greater electrical resistance change signal, and further relates to a magnetoresistance effect type head using such a magnetoresistance effect film. These magnetoresistance effect film and magnetoresistance effect type head using such a magnetoresistance effect film are mainly incorporated in, for example, a hard disk drive.

2. Description of the Related Art

Recently, there has been the development for increasing the sensitivity of magnetic sensors and increasing the density in magnetic recording and, following this, magnetoresistance effect type magnetic sensors (hereinafter referred to as MR sensors) and magnetoresistance effect type magnetic heads (hereinafter referred to as MR heads) using magnetoresistance change have been actively developed. Both MR sensors and MR heads are designed to read out external magnetic field signals on the basis of the variation in resistance of a reading sensor portion formed of magnetic material. The MR sensors have an advantage that a high sensitivity can be obtained and the MR heads have an advantage that a high output can be obtained upon reading out signals magnetically recorded in high density because the reproduced output does not depend on the relative speed of the sensors or heads to the recording medium.

However, conventional MR sensors which are formed of magnetic materials such as $Ni_{80}Fe_{20}$ (Permalloy), NiCo or the like have a small resistance change ratio $\Delta R/R$ which is about 1 to 3% at maximum, and thus these materials have insufficient sensitivity as the reading MR head materials for ultrahigh density recording of the order of several GBPSI (Giga Bits Per Square Inches) or more.

Attention has been recently paid to artificial lattices having the structure in which thin films of metal having a thickness of an atomic diameter order are periodically stacked, because their behavior is different from that of bulk metal. One of such artificial lattices is a magnetic multilayered film having ferromagnetic metal thin films and non-magnetic metal thin films alternately deposited on a substrate. Heretofore, magnetic multilayered films of an iron-chromium type, a cobalt-copper type and the like have been known. However, these artificial lattice magnetic multilayered films are not commercially applicable as they are because the external magnetic field at which a maximum resistance change occurs (operating magnetic field intensity), is as high as several tens of kilo-oersted.

Under these circumstances, a new structure which is called a spin valve has been proposed. In this structure, two NiFe layers are formed via a non-magnetic metal layer, and a pinning layer such as an antiferromagnetic layer is further formed so as to be adjacent to one of the NiFe layers.

In this case, since the antiferromagnetic layer and the NiFe layer adjacent thereto are directly exchange-coupled to each other, the direction of the magnetic spin of this NiFe layer is fixed in the range of several tens to several hundreds Oe in magnetic field intensity. On the other hand, the direction of the magnetic spin of the other NiFe layer is freely changeable by an external magnetic field. As a result, there can be achieved a magnetoresistance change ratio (MR ratio) of 2 to 5% in a small magnetic field range which corresponds to the degree of coercive force of the NiFe layer.

In the spin valve, by realizing a difference in relative angles of spins between two magnetic layers, the large MR change which differs from the conventional anisotropy magnetoresistance (AMR) effect is accomplished. This is realized by pinning of the magnetic layer spin due to the direct exchange coupling force between one of the magnetic layers and the pinning layer. This exchange coupling can be the substance of the spin valve.

The magnetic head using such a spin valve film can read out magnetic information recorded in ultrahigh density, however, following the high densification of hard disks, the demand for improving the spin valve type reading magnetic head ability has been increasing year by year. Further, it is demanded to develop a spin valve film structure, which is capable of reading magnetic information recorded in higher density and achieving higher outputs, and a magnetic head using such a spin valve film structure. In addition, it is also demanded that the linearity of a derived signal relative to an external magnetic field is excellent.

The present invention has been made under these circumstances and has an object to provide a magnetoresistance effect film which can achieve an increased head output and which is excellent in sensitivity for detecting a magnetic signal and in linearity of a derived signal, and further provide a magnetoresistance effect type head having such a magnetoresistance effect film.

SUMMARY OF THE INVENTION

For solving the foregoing problems, according to one aspect of the present invention, there is provided a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, and a pinning layer which is formed on a surface of the ferromagnetic layer (remote from a surface thereof abutting the non-magnetic metal layer) so as to pin a direction of magnetization of the ferromagnetic layer, wherein the soft magnetic layer is set to freely change its magnetization direction in response to an external magnetic field as magnetic information, and wherein the soft magnetic layer comprises a multilayered body having at least two layers and including a first soft magnetic layer substantially made of Co or CoFe, and a second soft magnetic layer substantially made of NiFeX (wherein X represents at least one selected from Ta and Nb) in the order named from the side of the non-magnetic metal layer.

It is preferable that the second soft magnetic layer constituting part of the soft magnetic layer is substantially made of NiFeTa, and the percentage content of Ta is set to 1 wt % to 30 wt %.

It is preferable that the second soft magnetic layer constituting part of the soft magnetic layer is substantially made of NiFeNb, and the percentage content of Nb is set to 1 wt % to 15 wt %.

According to another aspect of the present invention, there is provided a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, and a pinning layer which is formed on a surface of the ferromagnetic layer (remote from a surface thereof abutting the non-magnetic metal layer) so as to pin a direction of magnetization of the ferromagnetic layer, wherein the soft magnetic layer is set to freely change its magnetization direction in response to an external magnetic field as magnetic information, and wherein the soft magnetic layer comprises a multilayered body having at least three layers and including a first soft magnetic layer substantially made of Co or CoFe, a third soft magnetic layer substantially made of NiFe, and a second soft magnetic layer substantially made of NiFeX (wherein X represents at least one selected from Ta and Nb) in the order named from the side of the non-magnetic metal layer.

It is preferable that the second soft magnetic layer constituting part of the soft magnetic layer is substantially made of NiFeTa, and the percentage content of Ta is set to 1 wt % to 30 wt %.

It is preferable that the second soft magnetic layer constituting part of the soft magnetic layer is substantially made of NiFeNb, and the percentage content of Nb is set to 1 wt % to 15 wt %.

It is preferable that the thickness of the third soft magnetic layer, which constitutes part of the soft magnetic layer and is substantially made of NiFe, is set to 1 Å to 50 Å.

According to another aspect of the present invention, there is provided a magnetoresistance effect type head comprising a magnetoresistance effect film and a conductive film, the conductive film being conductively connected to the magnetoresistance effect film, and the magnetoresistance effect film being a spin valve multilayered film including a non-magnetic metal layer, a ferromagnetic layer formed on one surface of the non-magnetic metal layer, a soft magnetic layer formed on the other surface of the non-magnetic metal layer, and a pinning layer which is formed on a surface of the ferromagnetic layer (remote from a surface thereof abutting the non-magnetic metal layer) so as to pin a direction of magnetization of the ferromagnetic layer, wherein the soft magnetic layer is set to freely change its magnetization direction in response to an external magnetic field as magnetic information, and wherein the soft magnetic layer comprises a multilayered body having at least two layers and including a first soft magnetic layer substantially made of Co or CoFe, and a second soft magnetic layer substantially made of NiFeX (wherein X represents at least one selected from Ta and Nb) in the order named from the side of the non-magnetic metal layer.

According to another aspect of the present invention, there is provided a magnetoresistance effect type head comprising a magnetoresistance effect film and a conductive film, the conductive film being conductively connected to the magnetoresistance effect film, and the magnetoresistance effect film being a spin valve multilayered film including a non-magnetic metal layer, a ferromagnetic layer formed on one surface of the non-magnetic metal layer, a soft magnetic layer formed on the other surface of the non-magnetic metal layer, and a pinning layer which is formed on a surface of the ferromagnetic layer (remote from a surface thereof abutting the non-magnetic metal layer) so as to pin a direction of magnetization of the ferromagnetic layer, wherein the soft magnetic layer is set to freely change its magnetization direction in response to an external magnetic field as magnetic information, and wherein the soft magnetic layer comprises a multilayered body having at least three layers and including a first soft magnetic layer substantially made of Co or CoFe, a third soft magnetic layer substantially made of NiFe, and a second soft magnetic layer substantially made of NiFeX (wherein X represents at least one selected from Ta and Nb) in the order named from the side of the non-magnetic metal layer.

In the present invention, since the soft magnetic layer, which is set to freely change its magnetization direction in response to an external magnetic field as magnetic information, is composed of the predetermined materials in a laminate fashion, there can be obtained a magnetoresistance effect film which is excellent in detecting sensitivity and which can achieve an increased head output.

DETAILED DESCRIPTION OF THE INVENTION

Hereinbelow, the concrete carrying-out mode of the present invention will be described in detail.

Figure 1:
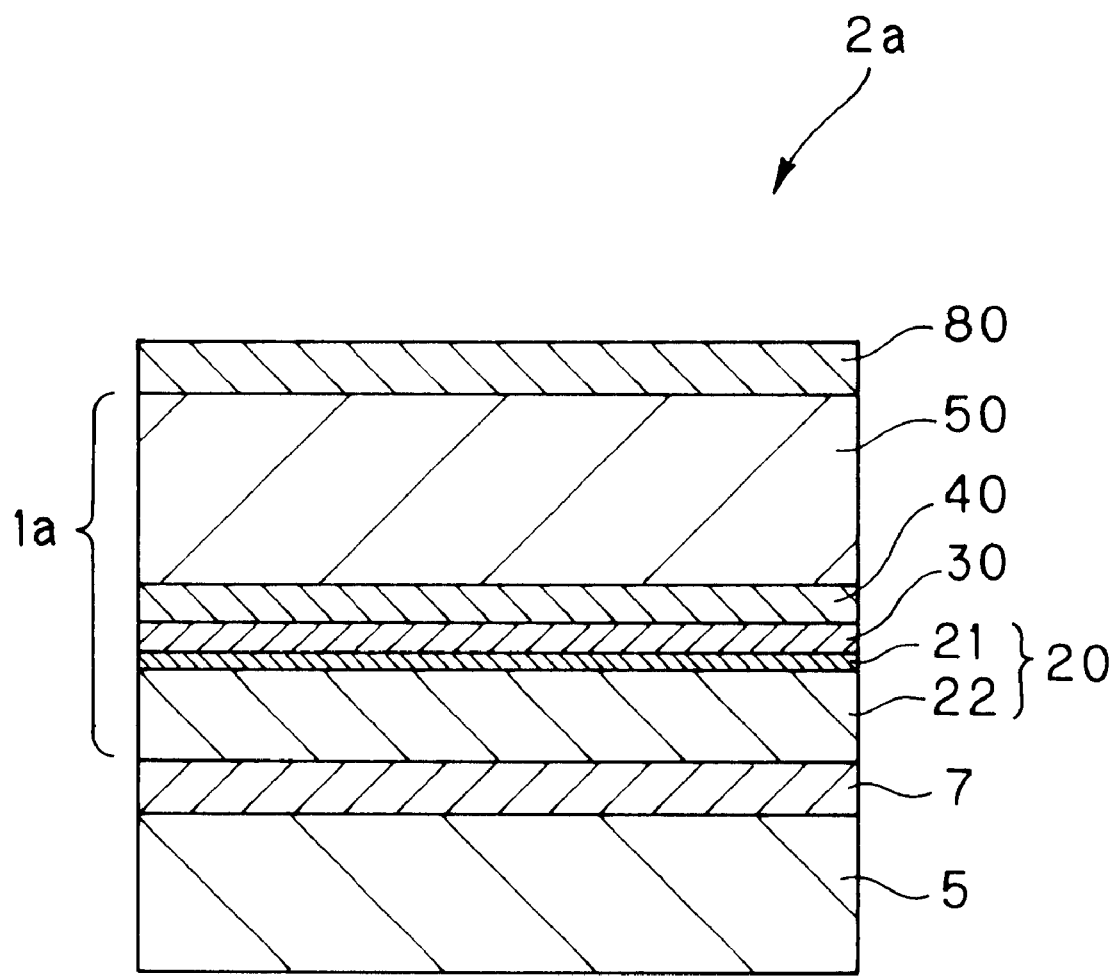
FIG. 1 is a sectional view showing a magnetoresistance effect film according to the present invention.

FIG. 1 is a sectional view showing a preferred example of a magnetoresistance effect film 2a. In this carrying-out mode, the magnetoresistance effect film 2a has a magnetic multilayered film 1a as a spin valve film showing a giant magnetoresistance effect.

As shown in FIG. 1, the magnetic multilayered film 1a has a laminate body structure which comprises a non-magnetic metal layer 30, a ferromagnetic layer 40 formed on one surface of the non-magnetic metal layer 30, a soft magnetic layer 20 formed on the other surface of the non-magnetic metal layer 30, and an pinning layer 50 which is formed on a surface of the ferromagnetic layer 40 remote from the other surface thereof abutting the non-magnetic metal layer 30 so as to pin the direction of magnetization of the ferromagnetic layer 40.

As shown in FIG. 1, the laminate body is formed on a substrate 5, and the layers are laminated from the side of the substrate 5 via an under layer 7 in the order of the soft magnetic layer 20, the non-magnetic metal layer 30, the ferromagnetic layer 40 and the pinning layer 50. As shown in the drawing, a protective layer 80 is further formed on the pinning layer 50.

In the magnetic multilayered film 1a (spin valve film) according to this carrying-out mode, it is required that the soft magnetic layer 20 and the ferromagnetic layer 40 which are adjacently formed at both sides of the non-magnetic metal layer 30 have substantially different magnetization directions from each other in accordance with a signal magnetic field applied from the external. The reason is as follows: In the principle of the present invention, when the magnetization directions of the soft magnetic layer 20 and the ferromagnetic layer 40 which are formed via the non-magnetic metal layer 30 interposed therebetween are deviated from each other, conduction electrons have a behavior of scattering due to spins to increase its resistance. In this case, when the magnetization directions are opposite to each other, the maximum resistance is obtained. That is, in this invention, when a signal magnetic field from the external is positive (in an upward direction with respect to a recording surface 93 of a recording medium 90 (represented by reference numeral 92)) as shown in FIG. 5, there occur mutually opposite components in the magnetization directions of the neighboring magnetic layers so that the resistance is increased.

Here, the relationship among the external signal magnetic field from the magnetic recording medium, the magnetization directions of the soft magnetic layer 20 and the ferromagnetic layer 40 and the variation of electrical resistance in the (spin valve) magnetic multilayered film used in the magnetoresistance effect film of the present invention will be described.

Figure 5:
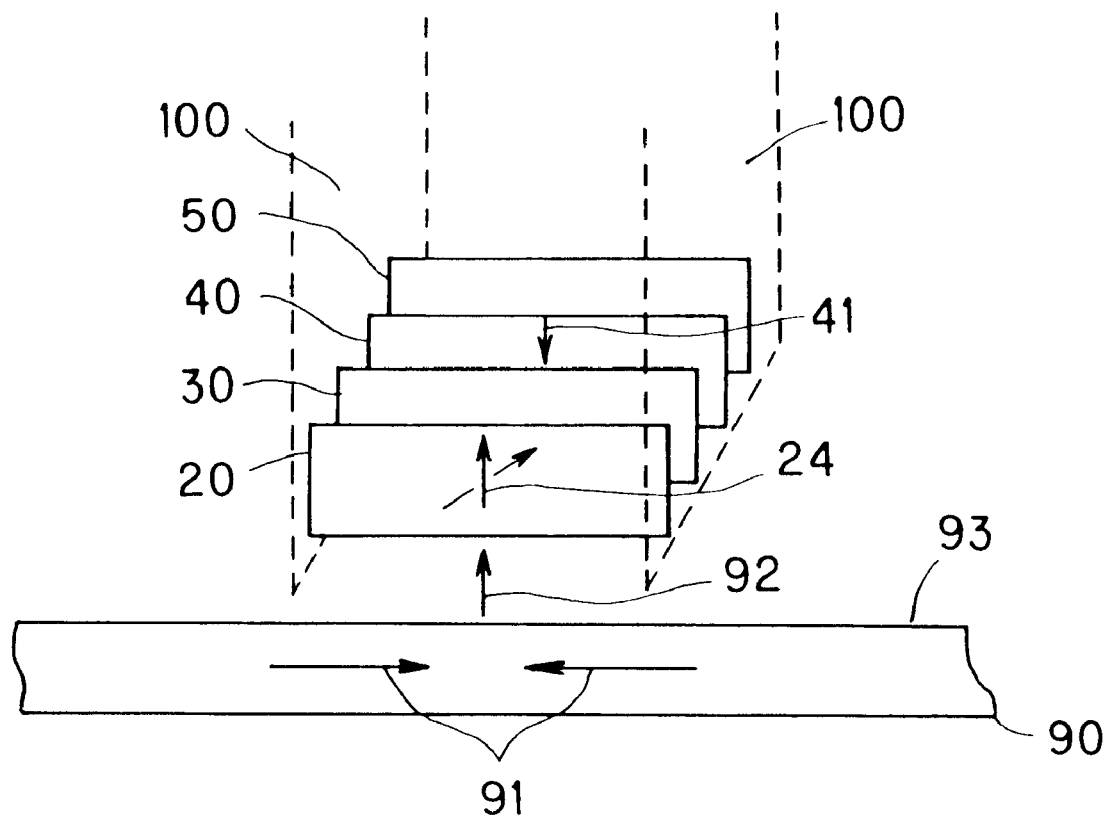
FIG. 5 is a schematic diagram showing a magnetoresistance effect film, particularly, a structure of a magnetic multilayered film, for explaining an operation of the present invention.

Now, in order to facilitate the understanding of the present invention, the simplest magnetic multilayered film in which the pair of soft magnetic layer 20 and ferromagnetic layer 40 exist via the non-magnetic metal layer 30 as shown in FIG. 5 will be described with reference to FIG. 5.

As shown in FIG. 5, the magnetization of the ferromagnetic layer 40 is pinned in a downward direction to the surface of the recording medium by a method as described later (see reference numeral 41). The soft magnetic layer 20 is formed via the non-magnetic metal layer 30 so that the magnetization direction thereof is varied in accordance with the signal magnetic field from the external (see reference numeral 21). At this time, the relative angle between the magnetization directions of the soft magnetic layer 20 and the ferromagnetic layer 40 is greatly varied in accordance with the direction of the signal magnetic field from the magnetic recording medium 90. As a result, the scattering degree of the conduction electrons flowing in the magnetic layers is varied, and thus the electrical resistance is greatly varied.

Accordingly, a large MR (Magneto-Resistance) effect, which essentially differs in mechanism from the anisotropic magnetoresistance effect of Permalloy, can be obtained. This is particularly called a GMR (Giant-Magneto-Resistance) effect.

Figure 6:
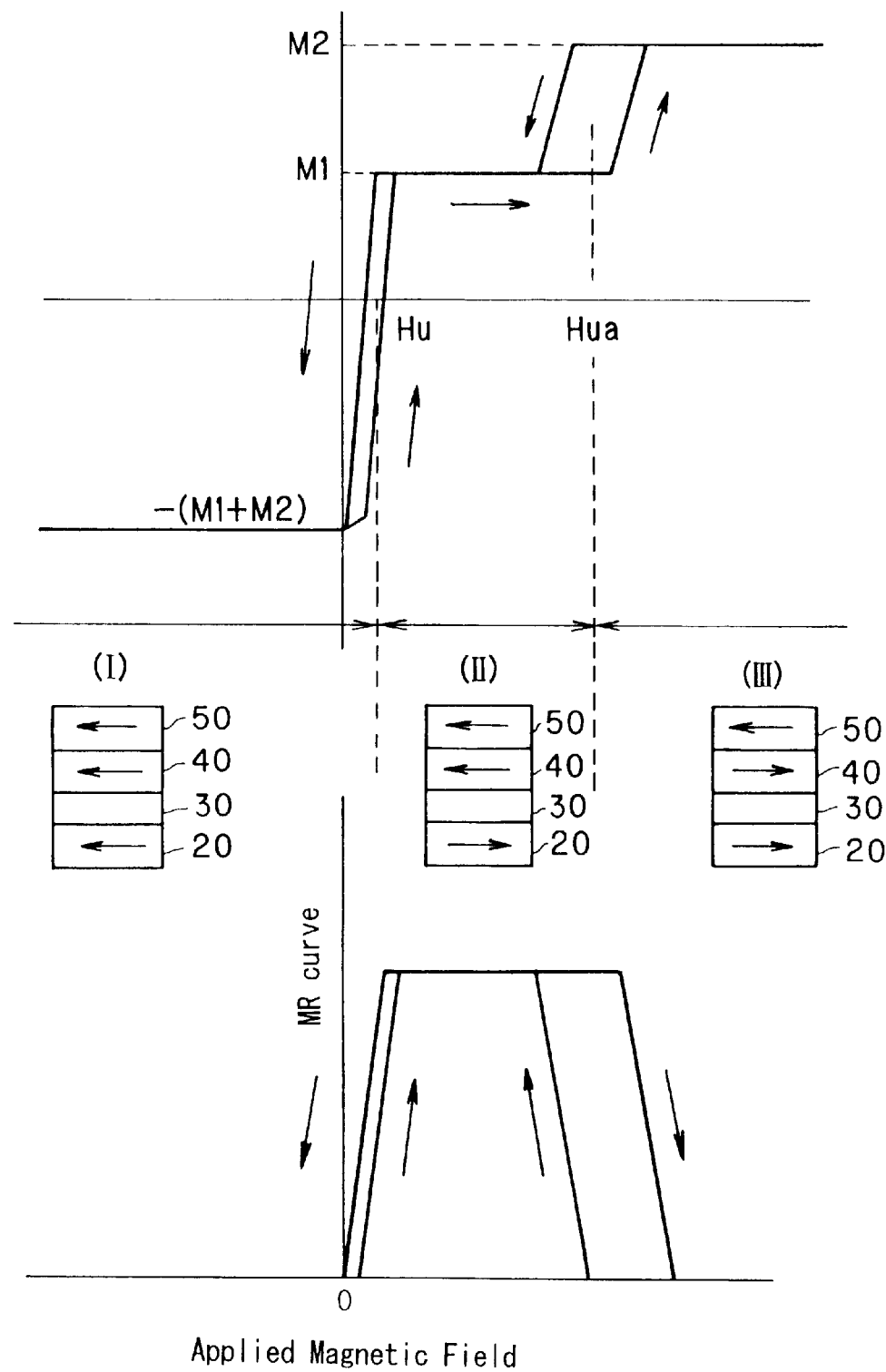
FIG. 6 is a schematic diagram showing a magnetization curve and an MR curve for explaining an operation of the present invention.

The magnetization directions of the soft magnetic layer 20, the ferromagnetic layer 40 and the pinning layer 50 exhibiting a pinning effect are varied relative to the external magnetic field. The variation of the magnetization directions thereof is shown in FIG. 6 in correspondence with the magnetization curve and the MR curve. In this case, all the magnetization of the ferromagnetic layer 40 is fixed in a minus direction (in a downward direction with respect to the recording surface of the recording medium 90) by the pinning layer 50. When the external signal magnetic field is minus, the magnetization of the soft magnetic layer 20 is also in the minus direction. Now, it is assumed that the coercive force of each of the soft magnetic layer 20 and the ferromagnetic layer 40 is approximate to zero in order to simplify the description. In an area (I) where the signal magnetic field $H<0$, the magnetization of both the soft magnetic layer 20 and the ferromagnetic layer 40 is still oriented in one direction.

When the external magnetic field is intensified and H exceeds the coercive force of the soft magnetic layer 20, the magnetization direction of the soft magnetic layer is rotated in the direction of the signal magnetic field, so that the magnetization and the electrical resistance are increased as the magnetization directions of the soft magnetic layer 20 and the ferromagnetic layer 40 become antiparallel to each other. Finally, these values are fixed (state of an area (II)). At this time, a pinning magnetic field Hua is applied by the pinning layer 50. If the signal magnetic field exceeds Hua, the magnetization of the ferromagnetic layer 40 is also rotated in the direction of the signal magnetic field, so that the magnetization of each of the soft magnetic layer 20 and the ferromagnetic layer 40 is oriented in the same direction in an area (III). At this time, the magnetization is set to a constant value, and the MR curve is equal to zero.

Conversely, when the signal magnetic field H is reduced, the magnetization is changed from the area (III) through the area (II) to the area (I) by inversion of the magnetization of the soft magnetic layer 20 and the ferromagnetic layer 40 in the same manner as described above. At an initial portion of the area (II), conduction electrons have a behavior of scattering dependent on spins, and the resistance is increased. In the area (II), the ferromagnetic layer 40 has little magnetization inversion because it is pinned, while the magnetization of the soft magnetic layer 20 increases linearly, so that the rate of spin-dependent scattered conduction electrons is gradually increased in accordance with the magnetization change of the soft magnetic layer 20. That is, if $Ni_{0.8}Fe_{0.2}$ whose Hc is low is selected for the soft magnetic layer 20 and a suitable unidirectional anisotropic magnetic field Hk is applied, a formed magnetic multilayered film has a linearly-varying resistance and a large magnetoresistance ratio in a small external magnetic field of several Oe to several tens Oe below Hk.

Hereinbelow, each constitution of the foregoing magnetoresistance effect film 2a will be described in detail. The first feature of this magnetoresistance effect film resides in a laminate structure constituting the soft magnetic layer 20 and laminate materials thereof.

Specifically, as shown in FIG. 1, the soft magnetic layer 20 of the present invention has a multilayered body having at least two layers, and includes a first soft magnetic 21 and a second soft magnetic layer 22 in the order named from the side of the non-magnetic metal layer 30.

As shown in FIG. 1, the first soft magnetic layer 21, which contacts with the non-magnetic metal layer 30, is substantially made of Co or CoFe. When the first soft magnetic layer 21 is made of CoFe, the Co content is desired to be no less than 80 wt %. The first soft magnetic layer 21 rich in Co mainly functions as a diffusion blocking layer for preventing the diffusion of Ni components from the second or third soft magnetic layer to the non-magnetic metal protect layer 30. The thickness of no less than 4 Å is sufficient for the first soft magnetic layer 21.

The second soft magnetic layer 22 formed to contact with the first soft magnetic layer 21 is substantially made of NiFeX, wherein X represents at least one material selected from Ta and Nb. Therefore, specifically, the second soft magnetic layer 22 is made of NiFeTa, NiFeNb or NiFeTaNb. Particularly, NiFeTa or NiFeNb is preferably used.

When using NiFeTa as the second soft magnetic layer 22, the percentage content of Ta is set to 1 wt % to 30 wt %, preferably, 3 wt % to 25 wt %, more preferably, 5 wt % to 20 wt %. When the content of Ta is less than 1 wt %, Ta does not exhibit its effect. When the content of Ta is greater than 30 wt %, $\Delta R$ is decreased, which is not desirable. The weight ratio of Ni/Fe is set to 4.0 to 7.0. When the weight ratio of Ni/Fe is set to be less than 4.0 or greater than 7.0, the magneto striction increases, resulting in great change in magnetic characteristics due to stress.

When using NiFeNb as the second soft magnetic layer 22, the percent content of Nb is set to 1 wt % to 15 wt %, preferably 3 wt % to 12 wt %, more preferably, 5 wt % to 10 wt %. When the content of Nb is less than 1 wt %, Nb does not exhibit its effect. When the content of Nb is greater than 15 wt %, $\Delta R$ is decreased, which is not desirable. The weight ratio of Ni/Fe is set to 4.0 to 7.0. When the weight ratio of Ni/Fe is set to be less than 4.0 or greater than 7.0, the magneto striction increases, resulting in great change in magnetic characteristics due to stress.

As shown in FIG. 1, when using the two-layered form soft magnetic layer 20, the thickness of the second soft magnetic layer 22 is preferably set to 17 Å to 87 Å, and the total thickness of the soft magnetic layer 20 is set to 20 Å to 90 Å. When the total thickness of the soft magnetic layer 20 is less than required, an excellent property as a soft magnetic layer can not be obtained. When the total thickness of the soft magnetic layer is more than required, the total thickness of the multilayered film also becomes more than required, and the resistance of the total magnetic multilayered film is decreased, thus the MR effect and $\Delta R$ tend to be decreased.

Figure 2:
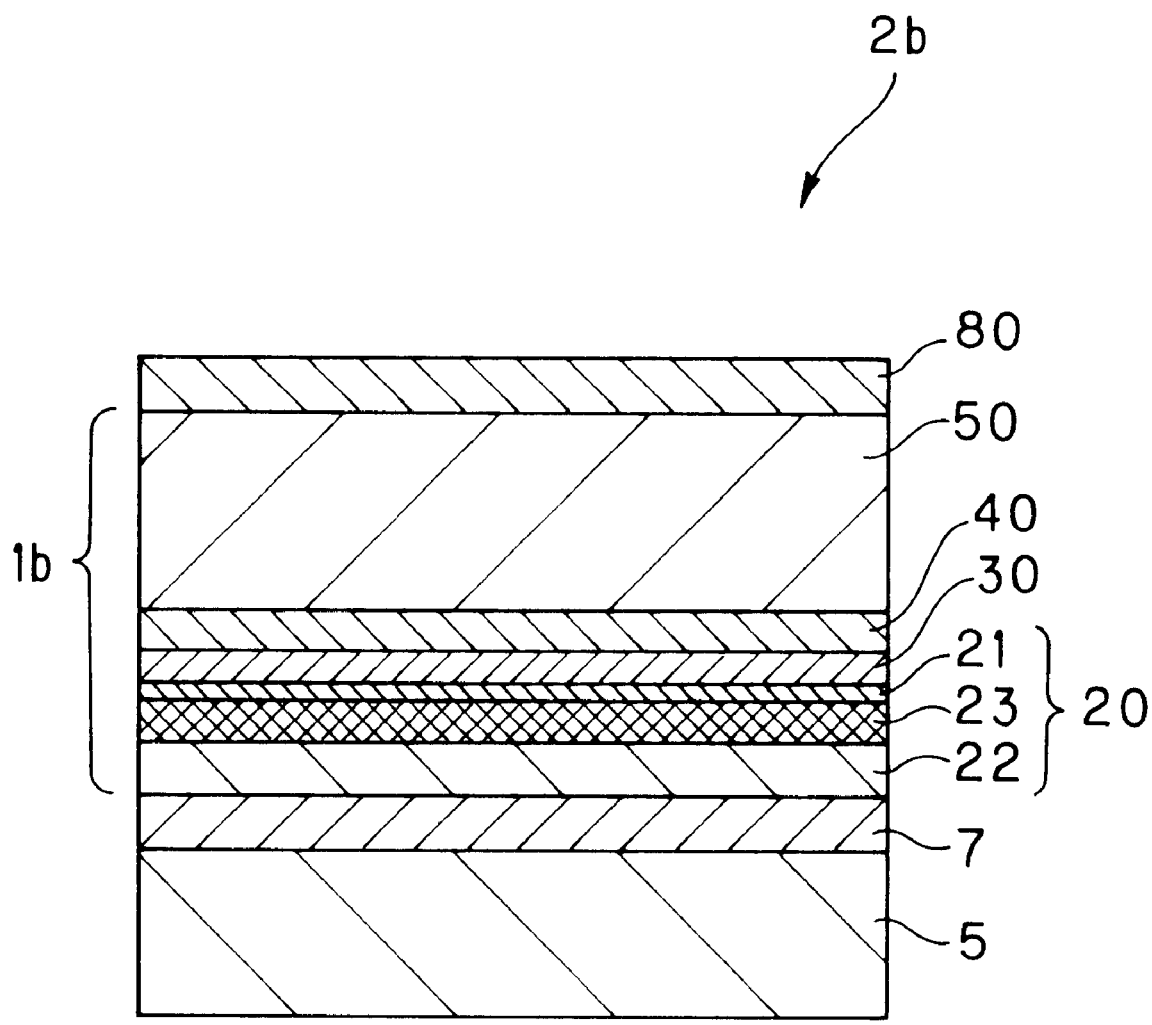
FIG. 2 is a sectional view showing a magnetoresistance effect film according to the present invention.

In FIG. 2, a magnetoresistance effect film 2b as a modification of the foregoing magnetoresistance effect film 2a (FIG. 1) is shown. The magnetoresistance effect film 2b in FIG. 2 differs from the magnetoresistance effect film 2a in FIG. 1 in that a soft magnetic layer 20 in FIG. 2 has a three-layered structure. Specifically, the soft magnetic layer 20 in FIG. 2 has a three layered body which includes a first soft magnetic layer 21 substantially made of Co or CoFe (wherein Co is no less than 80 wt %), a third soft magnetic layer 23 substantially made of NiFe, and a second soft magnetic layer 22 substantially made of NiFeX (wherein X represents at least one material selected from Ta and Nb) in the order named from the side of the non-magnetic metal layer 30. In other words, the structure is obtained by providing the third soft magnetic layer 23 as an intermediate layer by replacing a portion of the second soft magnetic layer 22 with the third soft magnetic layer 23 made of NiFe.

Therefore, the materials of the first soft magnetic layer 21 and the second soft magnetic layer 22 are identical to those described above. Further, the thickness of the second soft magnetic layer 22 is decreased by an amount corresponding to the thickness of the third soft magnetic layer 23 made of NiFe. The thickness of the third soft magnetic layer 23 made of NiFe is set to 1 Å to 50 Å, preferably 5 Å to 50 Å, more preferably 10 Å to 30 Å. When the thickness is less than 1 Å, the NiFe layer does not sufficiently exhibit its effect, and when the thickness is greater than 50 Å, the resistance of the layer is decreased, thus the $\Delta R$ is also decreased, which is not desirable. Further, the weight ratio of Ni/Fe of the third soft magnetic layer 23 is set to 4.0 to 7.0 for obtaining excellent soft magnetic characteristics. By providing the third soft magnetic layer 23 made of NiFe as an intermediate layer, the detection sensitivity and the magnetic head output are further improved. It will be apparent from examples described later.

Figure 3:
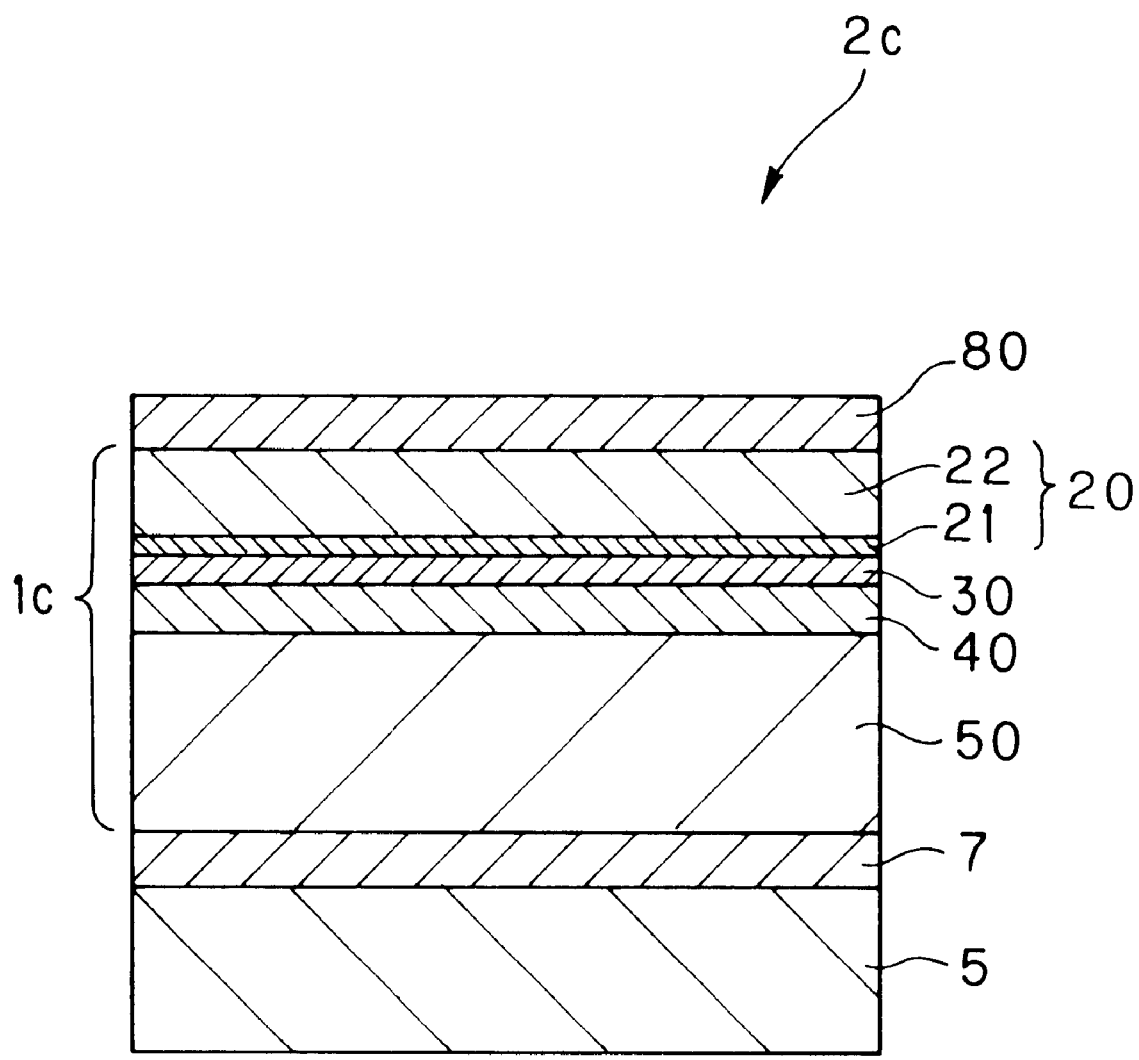
FIG. 3 is a sectional view showing a magnetoresistance effect film according to the present invention.

In FIG. 3, a magnetoresistance effect film 2c as a modification of the magnetoresistance effect film 2a (FIG. 1) is shown. The magnetoresistance effect film 2c in FIG. 3 differs from the magnetoresistance effect film 2a in FIG. 1 in that the laminate order of a magnetic multilayered film 1c as a spin valve layer in FIG. 3 is reversed as compared with that of the magnetic multilayered film 1a in FIG. 1. Specifically, in FIG. 3, the magnetic multilayered film 1c is formed on the substrate 5 via the under layer 7, and the layers are laminated from the side of the substrate 5 in the order of the pinning layer 50, the ferromagnetic layer 40, the non-magnetic metal layer 30, and the soft magnetic layer 20. As shown in the drawing, a protective layer 80 is further formed on the soft magnetic layer 20. As in FIG. 1, the structure of the soft magnetic layer 20 in FIG. 3 includes the first soft magnetic layer 21 and the second soft magnetic layer 22 which are formed in the order named from the non-magnetic metal layer 30. The specification (materials, thicknesses, etc.) of the first and second soft magnetic layers is basically the same as that in FIG. 1.

Figure 4:
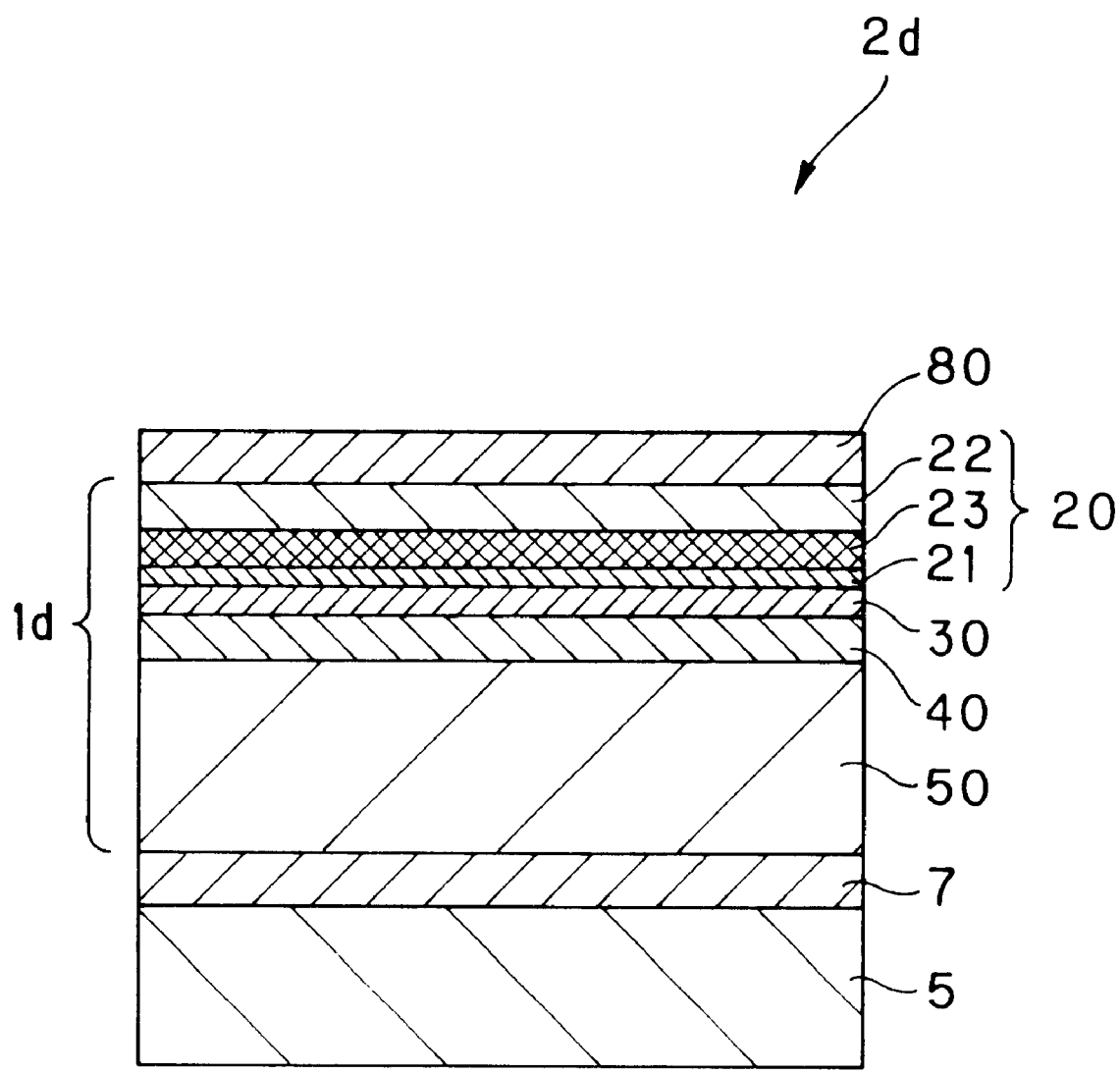
FIG. 4 is a sectional view showing a magnetoresistance effect film according to the present invention.

In FIG. 4, a magnetoresistance effect film 2d as a modification of the magnetoresistance effect film 2b (FIG. 2) is shown. The magnetoresistance effect film 2d in FIG. 4 differs from the magnetoresistance effect film 2b in FIG. 2 in that the laminate order of a magnetic multilayered film 1d as a spin valve layer in FIG. 4 is reversed as compared with that of the magnetic multilayered film 1b in FIG. 2. Specifically, in FIG. 4, the magnetic multilayered film 1d is formed on the substrate 5 via the under layer 7, and the layers are laminated from the side of the substrate 5 in the order of the pinning layer 50, the ferromagnetic layer 40, the non-magnetic metal layer 30, and the soft magnetic layer 20. As shown in the drawing, a protective layer 80 is further formed on the soft magnetic layer 20. As in FIG. 2, the structure of the soft magnetic layer 20 in FIG. 4 includes the first soft magnetic layer 21, the third soft magnetic layer 23 and the second soft magnetic layer 22 which are formed in the order named from the non-magnetic metal layer 30. The specification (materials and thicknesses, etc.) of the first, second and third soft magnetic layers are basically the same as that in FIG. 2.

In FIGS. 1 to 4, the pinning layer 50 for pinning the magnetization direction of the ferromagnetic layer 40, i.e. for exchange coupling with the ferromagnetic layer 40, is preferably made of PtMn, NiMn, IrMn, RuMn, RuRhMn, PdMn, RePdMn, FeMn, RhMn, CoMn, CoO, or NiO etc. These materials include some materials which require a heat treatment, after the film formation, for exchange coupling with the ferromagnetic layer 40.

The thickness of the pinning layer 50 is set to 5 nm to 100 nm, preferably 5 nm to 80 nm, more preferably 5 nm to 50 nm, most preferably 5 nm to 30 nm. When the thickness of the pinning layer 50 is less than 5 nm, the exchange coupling magnetic field Hua and the blocking temperature Tb are rapidly decreased. Contrary to this, when the thickness is increased, no particular problem arises, however, when the thickness is too thick, the gap length (the length between the shields) as a MR head becomes too large, which is not adequate for ultrahigh density magnetic recording. Therefore, it is preferable that the thickness is less than 100 nm.

The ferromagnetic layer 40 is formed of a metal element such as Fe, Ni, Co, Mn, Cr, Dy, Er, Nd, Tb, Tm, Ce, Gd, alloy or compound containing the above metal element. Particularly, it is preferably formed of a composition expressed by $(Co_zNi_{1-z})_wFe_w$ ($0.4 \leq z \leq 1.0$, $0.5 \leq w \leq 1.0$ by weight). When these conditions are not satisfied, a larger change in electrical resistance can not be obtained, which is not desired.

The thickness of the ferromagnetic layer 40 is set to 1.6 nm to 10 nm, preferably 2 nm to 6 nm. When the thickness is less than 1.6 nm, the characteristics as a magnetic layer is lost. If the thickness is more than 10 nm, the pinning magnetic field from the pinning layer 50 is decreased so that the pinning effect for the ferromagnetic layer can not sufficiently achieved.

As described above, since the ferromagnetic layer 40 is in direct abutment with the antiferromagnetic layer 50, a direct interlayer interaction acts on each other after a heat treatment at a given temperature or a deposition process of the film, and the rotation of the magnetization of the ferromagnetic layer 40 is prevented. On the other hand, with respect to the soft magnetic layer 20 which is formed via the non-magnetic metal layer 30 and the ferromagnetic layer 40, its magnetization can be freely rotated by a signal magnetic field from the external. As a result, a relative angle is produced in magnetization between the soft magnetic layer 20 and the ferromagnetic layer 40, so that a large MR effect due to the difference between the magnetization directions can be obtained.

In the present invention, as described above, the soft magnetic layer 20 has the laminate body structure of no less than two layers or no less than three layers made of the predetermined materials.

The non-magnetic metal layer 30 interposed between the soft magnetic layer 20 and the ferromagnetic layer 40 is preferably made of conductive metal for efficiently conducting electrons. More specifically, it may be made of at least one selected from Au, Ag and Cu, or an alloy containing no less than 60 wt % of at least one of these elements.

The thickness of the non-magnetic metal layer 30 is preferably set to 15 Å to 40 Å. If this value is smaller than 15 Å, the soft magnetic layer 20 and the ferromagnetic layer 40 sandwiching the non-magnetic metal layer 30 therebetween are exchange-coupled to each other, so that the spins of the soft magnetic layer 20 and the ferromagnetic layer 40 do not function independently of each other. If this value exceeds 40 Å, the rates of the electrons which are scattered at the interfaces between itself and the soft magnetic layer 20 and between itself and the ferromagnetic layer 40 are reduced so that the MR ratio is reduced.

Generally, the protective layer 80 is provided to prevent oxidation of the surface of the magnetic multilayered film in a film-forming process and improve wettability with an electrode material formed thereon and an adhesive strength.

The protective layer 80 is formed of Ti, Ta, W, Cr, Hf, Zr, Zn or the like. The thickness thereof is generally set to about 30 to 300 Å.

The substrate 5 is formed of glass, silicon, MgO, GaAs, ferrite, AlTiC, $CaTiO_3$ or the like, and the thickness thereof is normally set to about 0.5 to 10 mm.

The under layer 7 is formed of Ta, Hf, Cr, Zr or the like. The thickness thereof is normally set to about 20 to 200 Å.

The material of each layer and the thickness thereof are specified as described above, and an external magnetic field is applied in a direction within the film surface as described later at the film formation time of at least the soft magnetic layer 20 to apply anisotropic magnetic field Hk of 2 to 20 Oe, preferably 2 to 16 Oe, and more preferably 2 to 10 Oe.

If the anisotropic magnetic field Hk of the soft magnetic layer is lower than 2 Oe, it is equal to the same degree of the coercive force, and no linear MR change curve can be substantially obtained in the vicinity of zero magnetic field, so that the characteristic as the MR element is deteriorated. On the other hand, if it is higher than 20 Oe, when this film is applied to the MR head or the like, the output is liable to be reduced and the resolution is reduced. The value Hk as described above can be obtained by applying the external magnetic field of 10 to 300 Oe at the film formation. If the external magnetic field is no greater than 10 Oe, it is too insufficient to induce Hk. On the other hand, if it exceeds 300 Oe, the effect is not improved although a coil must be designed in large size due to an occurrence of magnetic field. Therefore, the cost is increased and thus it is inefficient.

The magnetic multilayered film 1a (or either 1b or 1d) may be repetitively laminated to form a magnetoresistance effect film. In this case, the repetitive laminate frequency n of the magnetic multilayered film is not limited to a specific value, and it may be suitably selected in accordance with a desired magnetoresistance ratio, etc. Generally, the frequency n is set to 1 to 5.

The film formation of each layer of the foregoing spin valve multilayered film is carried out by ion beam sputtering, spattering, deposition, molecular beam epitaxy method (MBE) or the like.

In the examples shown in FIGS. 1 to 4, the films are formed in turn from the lower layer to the upper layer in the figures.

For the film formation, it is preferable that an external magnetic field of 10 to 300 Oe is applied in one direction within the film plane at the film formation of the soft magnetic layer 20. With this operation, the anisotropic magnetic field Hk can be provided to the soft magnetic layer 20. The application of the external magnetic field may be performed at only the film formation time of the soft magnetic field, for example, using a device which is equipped with an electromagnet or the like which is capable of easily controlling an application timing of the magnetic field, and no external magnetic field is applied at the film formation time of the antiferromagnetic layer 50. Alternatively, a method of applying a constant magnetic field at the film formation time at all times may be used.

As described above, by applying the external magnetic field in one direction within the film plane at least upon film formation of the soft magnetic layer 20 to induce the anisotropic magnetic field Hk, the high frequency characteristic can be further improved.

Furthermore, when forming the antiferromagnetic player 50, the magnetic field is preferably applied in a direction perpendicular to the direction of the magnetic field applied at the film formation time of the soft magnetic film 20. Specifically, it is applied within the film plane of the magnetic multilayered film and in a direction orthogonal to the measurement current. The magnitude of the applied magnetic field is preferably set in the range of 10 to 300 Oe. With this orthogonalization process carried out in advance, by applying a heat treatment after the formation of the magnetoresistance effect film, the magnetization direction of the ferromagnetic layer 40 is surely fixed in the applied magnetic field direction (direction perpendicular to the measurement current) by the antiferromagnetic layer 50, whereby the magnetization of the ferromagnetic layer can be most reasonably set to be antiparallel to the magnetization of the soft magnetic layer 20 whose direction can be freely changed by the signal magnetic field. However, this is not a necessary condition, and the direction of the magnetic field to be applied at the film formation time of the antiferromagnetic layer may be coincident with the direction of the magnetization of the magnetic field to be applied at the film formation time of the soft magnetic layer. At this time, it is preferable that the temperature is decreased while applying the magnetic field in a strip short-side direction (direction perpendicular to the direction of the applied magnetic field when the soft magnetic layer 20 is formed), when the heat treatment at 150 to 300° C., particularly about 200° C., is carried out in the process after the magnetic multilayered film is formed.

The magnetoresistance effect film having the magnetic multilayered film as described in each of the foregoing carrying-out modes is applied to a magnetoresistance effect type head (MR head), an MR sensor, a ferromagnetic memory element, an angle sensor or the like.

Hereinbelow, explanation will be given to an example where the magnetoresistance effect film 2a (FIG. 1) is applied to the magnetoresistance effect type head. As the magnetoresistance effect type head in the present invention, a spin valve head having a magnetic multilayered film revealing the giant magnetoresistance effect (GMR) may be cited as a preferred example.

Hereinbelow, the spin valve head will be picked up as the magnetoresistance effect type head (MR head) and given explanation.

Figure 7:
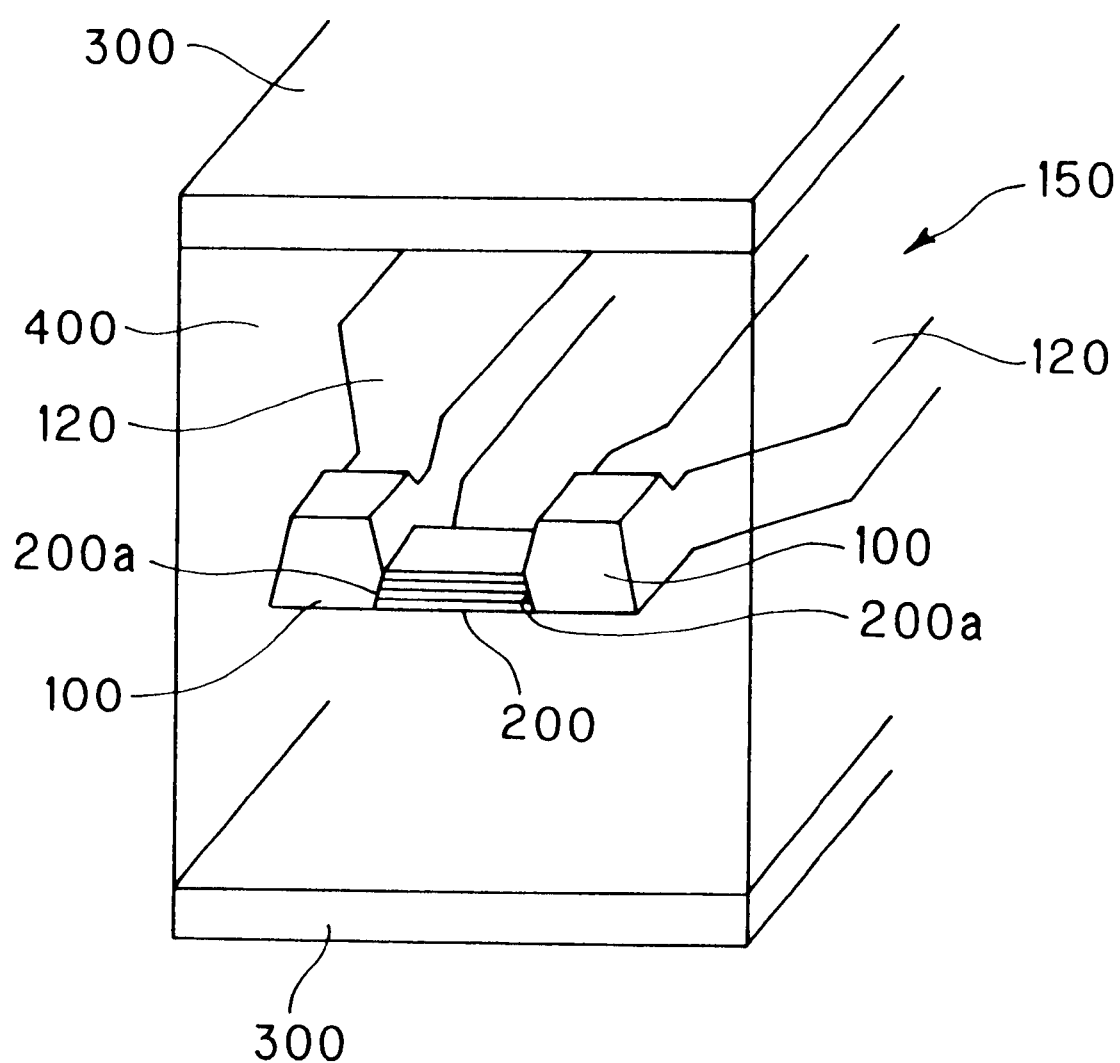
FIG. 7 is a schematic perspective view showing an example of a magnetoresistance effect type head according to the present invention.
Figure 8:
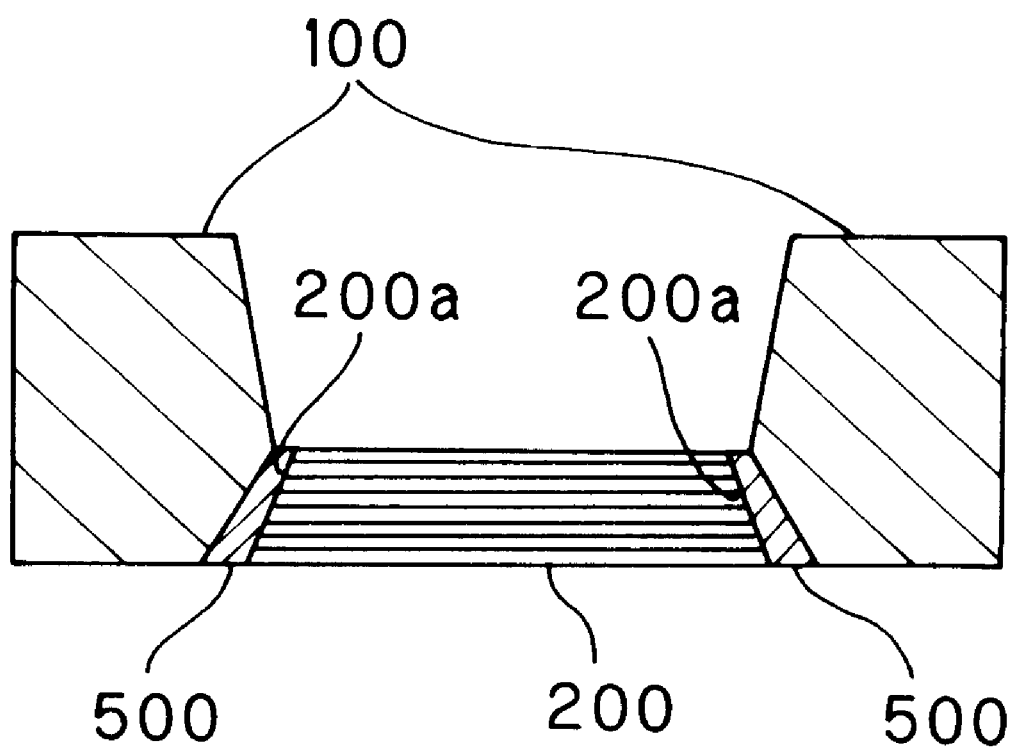
FIG. 8 is a schematic perspective view showing a preferred connection state between a magnetoresistance effect film and electrode portions of a magnetoresistance effect type head according to the present invention.

As shown in FIGS. 7 and 8, a magnetoresistance effect type head (MR head) 150 includes a magnetoresistance effect film 200 serving as a magnetically-sensitive portion for magnetically sensing a signal magnetic field, and electrode portions 100, 100 which are formed at both end portions 200a, 200a of the magnetoresistance effect film 200. Preferably, the whole both end portions 200a, 200a of the magnetoresistance effect film 200 serving as the magnetically-sensitive portion are connected to the electrode portions 100, 100. Conductive films 120, 120 are electrically conducted to the magnetoresistance effect film 200 through the electrode portions 100, 100. In this invention, the conductive film 120 and the electrode portion 100 are individually shown to simplify the description which will be made later, while in most cases the conductive film 120 and the electrode portion 100 are formed integral with each other by a thin film forming method. Accordingly, these elements may be considered as being formed of one member.

The magnetoresistance effect film 200 serving as the magnetically-sensitive portion of the MR head has substantially the same laminate structure as the magnetoresistance effect film 2a having the magnetic multilayered film 1a shown in FIG. 1. That is, the magnetoresistance effect film 200 is substantially replaced by the magnetoresistance effect film 2a having the magnetic multilayered film shown in FIG. 1, so that the magnetoresistance effect film 200 includes a non-magnetic metal layer 30, a ferromagnetic layer 40 formed on one surface of the non-magnetic metal layer 30, a soft magnetic layer 20 formed on the other surface of the non-magnetic metal layer 30, an pinning layer 50 which is formed on a surface of the ferromagnetic layer 40 remote from the other surface thereof abutting the non-magnetic metal layer 30 so as to pin the direction of magnetization of the ferromagnetic layer 40.

The same materials and thicknesses as described in the foregoing carrying-out mode of the magnetic multilayered film are preferably used for the ferromagnetic layer 40, the non-magnetic metal layer 30, the soft magnetic layer 20, and the pinning layer 50 used in the magnetoresistance effect film 200 as the magnetically-sensitive portion.

The magnetoresistance effect film 200 exhibits the so-called spin-valve type magnetoresistance change. The spin-valve type magnetoresistance change represents that, in the magnetic multilayered film having the non-magnetic metal layer 30, the ferromagnetic layer 40 formed on one surface of the non-magnetic metal layer 30, the soft magnetic layer 20 formed on the other surface of the non-magnetic metal layer 30 and the antiferromagnetic layer 50 formed on the ferromagnetic layer for pinning the magnetization direction of the ferromagnetic layer 40, an angle formed between the spin of the soft magnetic layer 20 and the spin of the pinned ferromagnetic layer 40 is set to approximately 90 degrees in an acute angle when the external signal magnetic field is zero. In practice, the angle may be 45 to 90 degrees, and most preferably 90 degrees (orthogonalization of magnetization) for causing the magnetoresistance effect curve (MR curve) to be asymmetrical relative to the plus and minus external magnetic fields with respect to the zero external magnetic field.

For achieving the orthogonalization of magnetization, it is necessary that the magnetic multilayered film 1a is subjected to a vacuum heat treatment in the magnetic field. This treatment is called an orthogonalization heat treatment, and a temperature during the treatment is called an orthogonalization temperature. In the orthogonalization heat treatment, it is preferable to change only the magnetization direction of the antiferromagnetic layer 50. Preferably, the orthogonalization temperature is lower than a temperature at which the induced magnetic anisotropy of the soft magnetic layer 20 is lost.

As shown in FIG. 8, the current-flowing electrode portions 100 are arranged so that both end portions 200a, 200a of the magnetoresistance effect film 200 are wholly contacted with the electrode portions 100 in the laminate direction of the magnetoresistance effect film 200. Then, the electrons intensively flow through the portion sandwiched between the soft magnetic layer 20 and the ferromagnetic layer 40. At this time, the electrons are magnetically scattered in accordance with the spin directions of the soft magnetic layer 20 and the ferromagnetic layer 40, so that the resistance is greatly varied. Accordingly, a fine change of the external magnetic field can be detected as a large change of electrical resistance.

The invention of the foregoing magnetoresistance effect film will be explained in further detail based on the following concrete experimental examples:

EXAMPLE I

Spin valve magnetoresistance effect films of the pinning layer 50 top type (see FIG. 1) as shown below were prepared. Specifically, each of the samples of the spin valve magnetoresistance effect films was prepared by stacking, on a substrate 5 (AlTiC with Al$_2$O$_3$), an under layer 7 (Ta; 50 Å in thickness), a soft magnetic layer 20 (80 Å in total thickness), a non-magnetic metal layer 30 (Cu; 30 Å in thickness), a ferromagnetic layer 40 (Co; 30 Å in thickness), a pinning layer 50 (PtMn antiferromagnetic layer; 300 Å in thickness) and a protective layer 80 (Ta; 50 Å in thickness) in the order named. The soft magnetic layer 20 was composed of a two-layered laminate body structure including a Co layer (10 Å in thickness) and an NiFeTa layer (70 Å in thickness; Ni/Fe weight ratio=6.7) in the order named from the side of the non-magnetic metal layer 30. In the samples, the Ta contents in the NiFeTa layers (70 Å in thickness) were changed as shown in Table 1.

After the formation of the spin valve multilayered film, a heat treatment was applied to each sample, wherein each sample was maintained in a magnetic field of 3 kOe at 250° C. for 5 hours, then the temperature was lowered to 80° C. at the rate of 22° C./h so as to complete the sample.

As to each sample, the resistance variation ΔR was measured in the manner described below. The value of the resistance variation ΔR in each sample is shown in Table 1. ΔRup representing an improved rate of the resistance variation ΔR was calculated in the following manner and is also shown in Table 1.

(1) Resistance Variation ΔR

The magnetic field was changed from −2 kOe to +2 kOe in the operating direction of the sample as a sensor, and ΔR was derived by subtracting the minimum resistance value from the maximum resistance value.

The measurement was carried out using a four probe (1270 μm constant interval) MRW wafer tester produced by PHASE METRICS INC. at a current of 25 mA.

(2) ΔRup representing Improved Rate of ΔR

ΔRup was derived from the measured value of ΔR using the following equation (1).

$$\Delta Rup = (\Delta R - \Delta R0)/\Delta R0 \times 100 (\%) \quad (1)$$

(wherein ΔR0 represents the resistance variation of a NiFe layer in which the percentage content of Ta in the NiFeTa layer is 0)

The results are shown in Table 1 below.

TABLE 1

| Sample No. | NiFeTa layer Ta content (wt %) | ΔR (Ω) | ΔRup (%) |
|---|---|---|---|
| I-1 (comparative) | 0 | 0.145 | 0 (reference) |
| I-2 | 1 | 0.150 | +3.4 |
| I-3 | 5 | 0.160 | +10.3 |
| I-4 | 10 | 0.168 | +15.9 |
| I-5 | 15 | 0.167 | +15.2 |
| I-6 | 20 | 0.163 | +12.4 |
| I-7 | 25 | 0.155 | +6.9 |
| I-8 | 30 | 0.150 | +3.4 |
| I-9 (comparative) | 35 | 0.145 | 0 |

From the results shown in Table 1, it is seen that in the inventive samples, the resistance variation ΔR was improved in the range of the percentage content of Ta being 1 wt % to 30 wt %. It was confirmed that the output was improved based on the improved resistance variation. Particularly, the resistance variation ΔR was significantly improved in the range of the percentage content of Ta being 5 wt % to 20 wt %.

EXAMPLE II

Spin valve magnetoresistance effect films of the pinning layer 50 bottom type (see FIG. 3) as shown below were prepared. Specifically, each of the samples of the spin valve magnetoresistance effect films was prepared by stacking, on a substrate 5 (AlTiC with Al$_2$O$_3$), an under layer 7 (Ta; 50 Å in thickness), a pinning layer 50 (PtMn antiferromagnetic layer; 300 Å in thickness), a ferromagnetic layer 40 (Co; 20 Å in thickness), a non-magnetic metal layer 30 (Cu; 25 Å in thickness), a soft magnetic layer 20 (60 Å in total thickness), and a protective layer 80 (Ta; 50 Å in thickness) in the order named. The soft magnetic layer 20 was composed of a two-layered laminate body structure including a Co layer (10 Å in thickness) and an NiFeTa layer (50 Å in thickness; Ni/Fe weight ratio=6.3) in the order named from the side of the non-magnetic metal layer 30. In the samples, the Ta contents in the NiFeTa layers (50 Å in thickness) were changed as shown in Table 2.

As to each sample, the resistance variation ΔR was measured and the improved rate ΔRup of the resistance variation ΔR was derived as in the foregoing Example I.

The results are shown in Table 2 below.

TABLE 2

| Sample No. | NiFeTa layer Ta content (wt %) | ΔR (Ω) | ΔRup (%) |
|---|---|---|---|
| II-1 (comparative) | 0 | 0.152 | 0 (reference) |
| II-2 | 1 | 0.158 | +3.9 |
| II-3 | 3 | 0.165 | +8.6 |
| II-4 | 5 | 0.170 | +11.8 |
| II-5 | 10 | 0.176 | +15.8 |
| II-6 | 15 | 0.175 | +15.1 |
| II-7 | 20 | 0.170 | +11.8 |
| II-8 | 30 | 0.158 | +3.9 |
| II-9 (comparative) | 35 | 0.152 | 0 |

From the results shown in Table 2, it is seen that in the inventive samples, the resistance variation ΔR was improved in the range of the percentage content of Ta being 1 wt % to 30 wt %. It was confirmed that the output was improved based on the improved resistance variation. Particularly, the resistance variation ΔR was significantly improved in the range of the percentage content of Ta being 5 wt % to 20 wt %.

EXAMPLE III

Spin valve magnetoresistance effect films of the pinning layer 50 top type (see FIG. 1) as shown below were prepared. Specifically, each of the samples of the spin valve magnetoresistance effect films was prepared by stacking, on a substrate 5 (AlTiC with Al$_2$O$_3$), an under layer 7 (Ta; 50 Å in thickness), a soft magnetic layer 20 (80 Å in total thickness), a non-magnetic metal layer 30 (Cu; 30 Å in thickness), a ferromagnetic layer 40 (Co; 30 Å in thickness), a pinning layer 50 (PtMn antiferromagnetic layer; 300 Å in thickness) and a protective layer 80 (Ta; 50 Å in thickness) in the order named. The soft magnetic layer 20 was composed of a two-layered laminate body structure including a Co layer (10 Å in thickness) and an NiFeNb layer (70 Å in thickness; Ni/Fe weight ratio=6.7) in the order named from the side of the non-magnetic metal layer 30. In the samples, the Nb contents in the NiFeNb layers (70 Å in thickness) were changed as shown in Table 3.

As to each sample, the resistance variation ΔR was measured and the improved rate ΔRup of the resistance variation ΔR was derived as in the foregoing Example I.

The results are shown in Table 3 below.

TABLE 3

| Sample No. | NiFeNb layer Nb content (wt %) | ΔR (Ω) | ΔRup (%) |
|---|---|---|---|
| III-1 (comparative) | 0 | 0.144 | 0 (reference) |
| III-2 | 1 | 0.150 | +4.1 |
| III-3 | 5 | 0.160 | +11.0 |
| III-4 | 10 | 0.158 | +9.7 |
| III-5 | 15 | 0.150 | +4.1 |
| III-6 (comparative) | 20 | 0.144 | 0 |

From the results shown in Table 3, it is seen that in the inventive samples, the resistance variation ΔR was improved in the range of the percentage content of Nb being 1 wt % to 15 wt %. It was confirmed that the output was improved based on the improved resistance variation. Particularly, the resistance variation ΔR was significantly improved in the range of the percentage content of Nb being 5 wt % to 10 wt %.

EXAMPLE IV

Spin valve magnetoresistance effect films of the pinning layer 50 top type (see FIG. 2) as shown below were prepared. Specifically, each of the samples of the spin valve magnetoresistance effect films was prepared by stacking, on a substrate 5 (AlTiC with $Al_2O_3$), an under layer 7 (Ta; 50 Å in thickness), a soft magnetic layer 20 (80 Å in total thickness), a non-magnetic metal layer 30 (Cu; 30 Å in thickness), a ferromagnetic layer 40 (Co; 30 Å in thickness), a pinning layer 50 (PtMn antiferromagnetic layer; 300 Å in thickness) and a protective layer 80 (Ta; 50 Å in thickness) in the order named. The soft magnetic layer 20 was composed of a three-layered laminate body structure including a Co layer (10 Å in thickness), an NiFe layer (tÅ in thickness (see Table 4); Ni/Fe weight ratio=82/18), and an $NiFeTa_{10}$ layer ((70−t)Å in thickness (see Table 4); percentage content of Ta is 10 wt %; Ni/Fe weight ratio=6.7). In each sample, a portion of the $NiFeTa_{10}$ layer having an initial thickness (70 Å) was replaced with the NiFe layer (tÅ in thickness). The thicknesses of the NiFe layers were changed as shown in Table 4.

As to each sample, the resistance variation ΔR was measured and the improved rate ΔRup of the resistance variation ΔR was derived as in the foregoing Example I.

The results are shown in Table 4 below.

TABLE 4

| Sample No. | NiFe layer Thickness (Å) | ΔR (Ω) | ΔRup (%) |
|---|---|---|---|
| I-1 (comparative) | 0 | 0.145 | 0 (reference) |
| I-4 | 0 | 0.168 | +15.9 |
| IV-1 | 1 | 0.171 | +17.9 |
| IV-2 | 5 | 0.177 | +22.0 |
| IV-3 | 10 | 0.183 | +26.2 |
| IV-4 | 20 | 0.182 | +25.5 |
| IV-5 | 30 | 0.177 | +22.0 |
| IV-6 | 40 | 0.174 | +20.0 |
| IV-7 | 50 | 0.171 | +17.9 |
| IV-8 | 60 | 0.165 | +13.8 |

Data from Table 1 with respect to Sample No. I-1 (comparative) and Sample No. I-4

From the results shown in Table 4, it is seen that in the inventive samples, the resistance variation ΔR was improved in the range of the thickness t of the NiFe layer being t=1 to 50 Å. It was confirmed that the output was improved based on the improved resistance variation. Particularly, the resistance variation ΔR was significantly improved in the range of the thickness t of the NiFe layer being t=10 to 30 Å.

EXAMPLE V

Spin valve magnetoresistance effect films of the pinning layer 50 top type (see FIG. 2) as shown below were prepared. Specifically, each of the samples of the spin valve magnetoresistance effect films was prepared by stacking, on a substrate 5 (AlTiC with $Al_2O_3$), an under layer 7 (Ta; 50 Å in thickness), a soft magnetic layer 20 (75 Å in total thickness), a non-magnetic metal layer 30 (Cu; 30 Å in thickness), a ferromagnetic layer 40 (Co; 30 Å in thickness), a pinning layer 50 (PtMn antiferromagnetic layer; 300 Å in thickness) and a protective layer 80 (Ta; 50 Å in thickness) in the order named. The soft magnetic layer 20 was composed of a three-layered laminate body structure including a Co layer (5 Å in thickness), an NiFe layer (tÅ in thickness (see Table 5); Ni/Fe weight ratio=82/18), and an $NiFeTa_5$ layer ((70−t)Å in thickness (see Table 5); percentage content of Ta is 5 wt %; Ni/Fe weight ratio=5.8). In each sample, a portion of the $NiFeTa_5$ layer having an initial thickness (70 Å) was replaced with the NiFe layer (tÅ in thickness). The thicknesses of the NiFe layers were changed as shown in Table 5.

As to each sample, the resistance variation ΔR was measured and the improved rate ΔRup of the resistance variation ΔR was derived as in the foregoing Example I.

The results are shown in Table 5 below.

TABLE 5

| Sample No. | NiFe layer Thickness (Å) | ΔR (Ω) | ΔRup (%) |
|---|---|---|---|
| I-1 (comparative) | 0 | 0.145 | 0 (reference) |
| V-1 | 0 | 0.160 | +10.3 |
| V-2 | 1 | 0.165 | +13.8 |
| V-3 | 5 | 0.170 | +17.2 |
| V-4 | 10 | 0.176 | +21.4 |
| V-5 | 20 | 0.175 | +20.7 |
| V-6 | 30 | 0.170 | +17.2 |
| V-7 | 40 | 0.167 | +15.1 |
| V-8 | 50 | 0.164 | +13.1 |
| V-9 | 60 | 0.158 | +9.0 |

ΔRup was derived using Sample No. I-1 (comparative) as a reference.

From the results shown in Table 5, it is seen that in the inventive samples, the resistance variation ΔR was improved in the range of the thickness t of the NiFe layer being t=1 to 50 Å. It was confirmed that the output was improved based on the improved resistance variation. Particularly, the resistance variation ΔR was significantly improved in the range of the thickness t of the NiFe layer being t=10 to 30 Å.

EXAMPLE VI

Spin valve magnetoresistance effect films of the pinning layer 50 bottom type (see FIG. 4) as shown below were prepared. Specifically, each of the samples of the spin valve magnetoresistance effect films was prepared by stacking, on a substrate 5 (AlTiC with $Al_2O_3$), an under layer 7 (Ta; 50 Å in thickness), a pinning layer 50 (PtMn antiferromagnetic layer; 250 Å in thickness), a ferromagnetic layer 40 (CoFe; 30 Å in thickness), a non-magnetic metal layer 30 (Cu; 24 Å in thickness), a soft magnetic layer 20 (95 Å in total thickness), and a protective layer 80 (Ta; 50 Å in thickness)

in the order named. The soft magnetic layer 20 was composed of a three-layered laminate body structure including a CoFe layer (15 Å in thickness; Co/Fe weight ratio=90/10), an NiFe layer (tÅ in thickness (see Table 6); Ni/Fe weight ratio=82/18), and an NiFeTa$_{10}$ layer ((80−t)Å in thickness (see Table 6); percentage content of Ta=10 wt %; Ni/Fe weight ratio=5.0) in the order named from the side of the non-magnetic metal layer 30. In each sample, a portion of the NiFeTa$_{10}$ layer having an initial thickness (80 Å) was replaced with the NiFe layer (tÅ in thickness). The thicknesses of the NiFe layers were changed as shown in Table 6.

As to each sample, the resistance variation ΔR was measured and the improved rate ΔRup of the resistance variation ΔR was derived as in the foregoing Example I.

The results are shown in Table 6 below.

TABLE 6

| Sample No. | NiFe layer thickness (Å) | ΔR (Ω) | ΔRup (%) |
|---|---|---|---|
| I-1 (comparative) | 0 | 0.145 | 0 (reference) |
| VI-1 | 0 | 0.160 | +10.3 |
| VI-2 | 1 | 0.163 | +12.4 |
| VI-3 | 5 | 0.168 | +15.9 |
| VI-4 | 10 | 0.173 | +19.3 |
| VI-5 | 20 | 0.172 | +18.6 |
| VI-6 | 30 | 0.169 | +16.6 |
| VI-7 | 40 | 0.165 | +13.8 |
| VI-8 | 50 | 0.160 | +10.3 |
| VI-9 | 60 | 0.156 | +7.6 |

ΔRup was derived using Sample No. I-1 (comparative) as a reference.

From the results shown in Table 6, it is seen that in the inventive samples, the resistance variation ΔR was improved in the range of the thickness t of the NiFe layer being t=1 to 50 Å. It was confirmed that the output was improved based on the improved resistance variation. Particularly, the resistance variation ΔR was significantly improved in the range of the thickness t of the NiFe layer being t=10 to 30 Å.

EXAMPLE VII

Spin valve magnetoresistance effect films of the pinning layer 50 top type (see FIG. 2) as shown below were prepared. Specifically, each of the samples of the spin valve magnetoresistance effect films was prepared by stacking, on a substrate 5 (AlTiC with Al$_2$O$_3$), an under layer 7 (Ta; 50 Å in thickness), a soft magnetic layer 20 (80 Å in total thickness), a non-magnetic metal layer 30 (Cu; 30 Å in thickness), a ferromagnetic layer 40 (Co; 30 Å in thickness), a pinning layer 50 (PtMn antiferromagnetic layer; 280 Å in thickness) and a protective layer 80 (Ta; 50 Å in thickness) in the order named. The soft magnetic layer 20 was composed of a three-layered laminate body structure including a Co layer (10 Å in thickness), an NiFe layer (tÅ in thickness (see Table 7); Ni/Fe weight ratio=82/18), and an NiFeNb$_{10}$ layer ((70−t)Å in thickness (see Table 7); percentage content of Nb is 10 wt %; Ni/Fe weight ratio=6.7). In each sample, a portion of the NiFeNb$_{10}$ layer having an initial thickness (70 Å) was replaced with the NiFe layer (tÅ in thickness). The thicknesses of the NiFe layers were changed as shown in Table 7.

As to each sample, the resistance variation ΔR was measured and the improved rate ΔRup of the resistance variation ΔR was derived as in the foregoing Example I.

The results are shown in Table 7 below.

TABLE 7

| Sample No. | NiFe layer Thickness (Å) | ΔR (Ω) | ΔRup (%) |
|---|---|---|---|
| III-1 (comparative) | 0 | 0.144 | 0 (reference) |
| VII-1 | 0 | 0.158 | +9.7 |
| VII-2 | 1 | 0.160 | +11.1 |
| VII-3 | 5 | 0.165 | +14.6 |
| VII-4 | 10 | 0.180 | +25.0 |
| VII-5 | 20 | 0.178 | +23.0 |
| VII-6 | 30 | 0.174 | +20.8 |
| VII-7 | 40 | 0.168 | +16.7 |
| VII-8 | 50 | 0.160 | +11.1 |
| VII-9 | 60 | 0.150 | +4.2 |

ΔRup was derived using Sample No. III-1 (comparative) as a reference.

From the results shown in Table 7, it is seen that in the inventive samples, the resistance variation ΔR was improved in the range of the thickness t of the NiFe layer being t=1 to 50 Å. It was confirmed that the output was improved based on the improved resistance variation. Particularly, the resistance variation ΔR was significantly improved in the range of the thickness t of the NiFe layer being t=10 to 30 Å.

EXAMPLE VIII

Spin valve magnetoresistance effect films of the pinning layer 50 top type (see FIG. 2) as shown below were prepared. Specifically, each of the samples of the spin valve magnetoresistance effect films was prepared by stacking, on a substrate 5 (AlTiC with Al$_2$O$_3$), an under layer 7 (Ta; 50 Å in thickness), a soft magnetic layer 20 (80 Å in total thickness), a non-magnetic metal layer 30 (Cu; 30 Å in thickness), a ferromagnetic layer 40 (CoFe; 30 Å in thickness), a pinning layer 50 (PtMn antiferromagnetic layer; 300 Å in thickness) and a protective layer 80 (Ta; 50 Å in thickness) in the order named. The soft magnetic layer 20 was composed of a three-layered laminate body structure including a CoFe layer (10 Å in thickness; Co/Fe weight ratio=90/10), an NiFe layer (tÅ in thickness (see Table 8); Ni/Fe weight ratio=82/18), and an NiFeNb$_5$ layer ((70−t)Å in thickness (see Table 8); percentage content of Nb is 5 wt %; Ni/Fe weight ratio=6.3). In each sample, a portion of the NiFeNb$_5$ layer having an initial thickness (70 Å) was replaced with the NiFe layer (tÅ in thickness). The thicknesses of the NiFe layers were changed as shown in Table 8.

As to each sample, the resistance variation ΔR was measured and the improved rate ΔRup of the resistance variation ΔR was derived as in the foregoing Example I.

The results are shown in Table 8 below.

TABLE 8

| Sample No. | NiFe layer thickness (Å) | ΔR (Ω) | ΔRup (%) |
|---|---|---|---|
| III-1 (comparative) | 0 | 0.144 | 0 (reference) |
| VIII-1 | 0 | 0.160 | +11.1 |
| VIII-2 | 1 | 0.164 | +13.9 |
| VIII-3 | 5 | 0.170 | +18.1 |
| VIII-4 | 10 | 0.183 | +27.1 |
| VIII-5 | 20 | 0.183 | +27.1 |
| VIII-6 | 30 | 0.179 | +24.3 |

TABLE 8-continued

| Sample No. | NiFe layer thickness (Å) | ΔR (Ω) | ΔRup (%) |
|---|---|---|---|
| VIII-7 | 40 | 0.172 | +19.4 |
| VIII-8 | 50 | 0.165 | +14.6 |
| VIII-9 | 60 | 0.155 | +7.6 |

ΔRup was derived using Sample No. III-1 (comparative) as a reference.

From the results shown in Table 8, it is seen that in the inventive samples, the resistance variation ΔR was improved in the range of the thickness t of the NiFe layer being t=1 to 50 Å. It was confirmed that the output was improved based on the improved resistance variation. Particularly, the resistance variation ΔR was significantly improved in the range of the thickness t of the NiFe layer being t=10 to 30 Å.

EXAMPLE IX

Considering a laminate film structure of Ta(50 Å)/NiFeTa (100 Å;Ni/Fe weight ratio=4.6)/Ta(50 Å) as a basic structure, samples were prepared by changing the percentage content of Ta in the NiFeTa layer (100 Å).

As to these samples, the saturation flux density (G) was derived from a magnetization curve, and a relation between the Ta content and the saturation flux density (G) was presented in a graph. The results are shown in FIG. 9.

Figure 9:
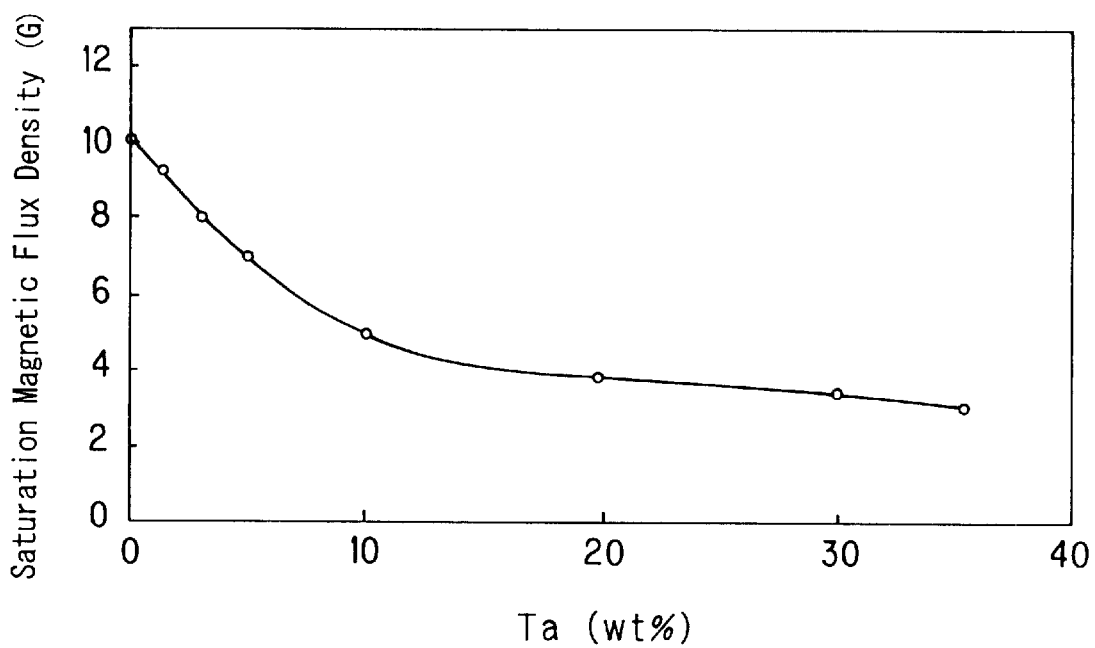
FIG. 9 is a graph showing a relationship between the Ta content in a second soft magnetic layer and the saturation magnetic flux density (G)

From the results shown in FIG. 9, it is seen that the saturation flux density (G) was decreased gradually as the percentage content of Ta was increased. Therefore, it is understood that the detection sensitivity against the external magnetic field is improved by increasing the percentage content of Ta.

EXAMPLE X

Considering a laminate film structure of Ta(50 Å)/NiFeNb (100 Å;Ni/Fe weight ratio=4.6)/Ta(50 Å) as a basic structure, samples were prepared by changing the percentage content of Nb in the NiFeNb layer (100 Å).

As to these samples, the saturation flux density (G) was derived from a magnetization curve, and a relation between the Nb content and the saturation flux density (G) was presented in a graph. The results are shown in FIG. 10.

Figure 10:
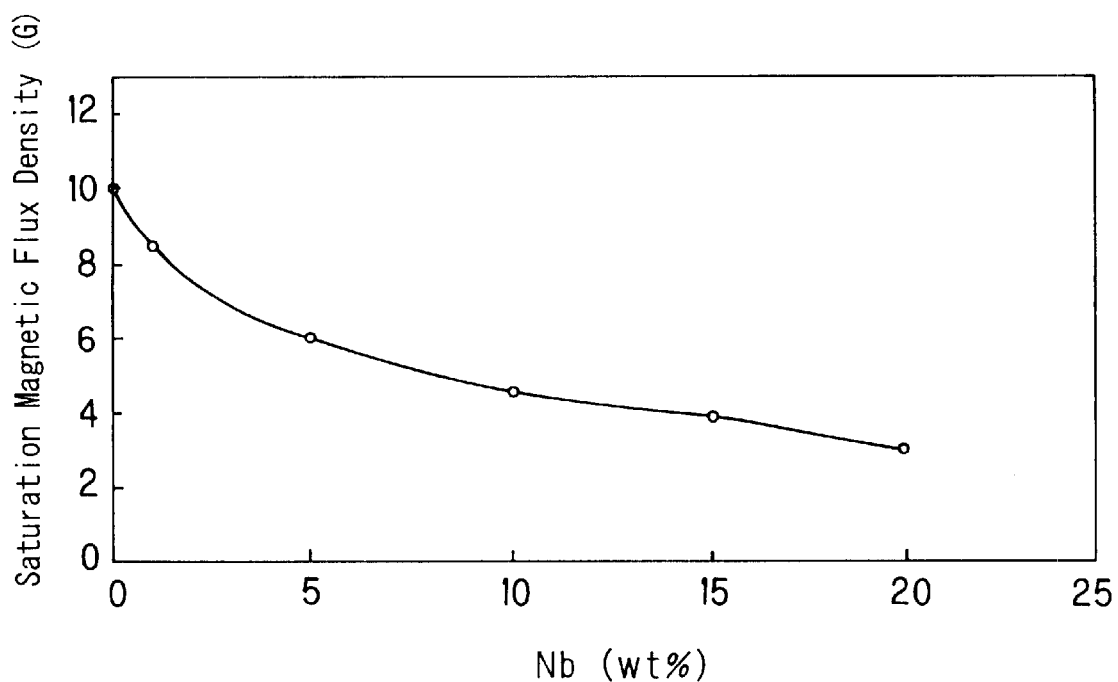
FIG. 10 is a graph showing a relationship between the Nb content in a second soft magnetic layer and the saturation magnetic flux density (G)

From the results shown in FIG. 10, it is seen that the saturation flux density (G) was decreased gradually as the percentage content of Nb was increased. Therefore, it is understood that the detection sensitivity against the external magnetic field is improved by increasing the percentage content of Nb.

EXAMPLE XI

Considering a laminate film structure of Ta(50 Å)/NiFeTa (70 Å;Ni/Fe weight ratio=4.6)/Ta(50 Å) as a basic structure, samples were prepared by changing the percentage content of Ta in the NiFeTa layer (70 Å).

As to these samples, the AMR (anisotropy magnetoresistance) value was derived in the following manner.

(1) AMR (%)

As to a rectangular sample having 20 μm×30 μm size, a current was applied in a long-axis direction, and a magnetic field was applied in a short-axis direction. The applied magnetic field was changed from −400 Oe to +400 Oe, and AMR (%) was derived from the following equation.

$$AMR=((\text{maximum resistance})-(\text{minimum resistance}))/(\text{minimum resistance})\times 100$$

A relation between the AMR value derived by the foregoing equation and the percentage content of Ta was presented in a graph. The results are shown in FIG. 11.

Figure 11:
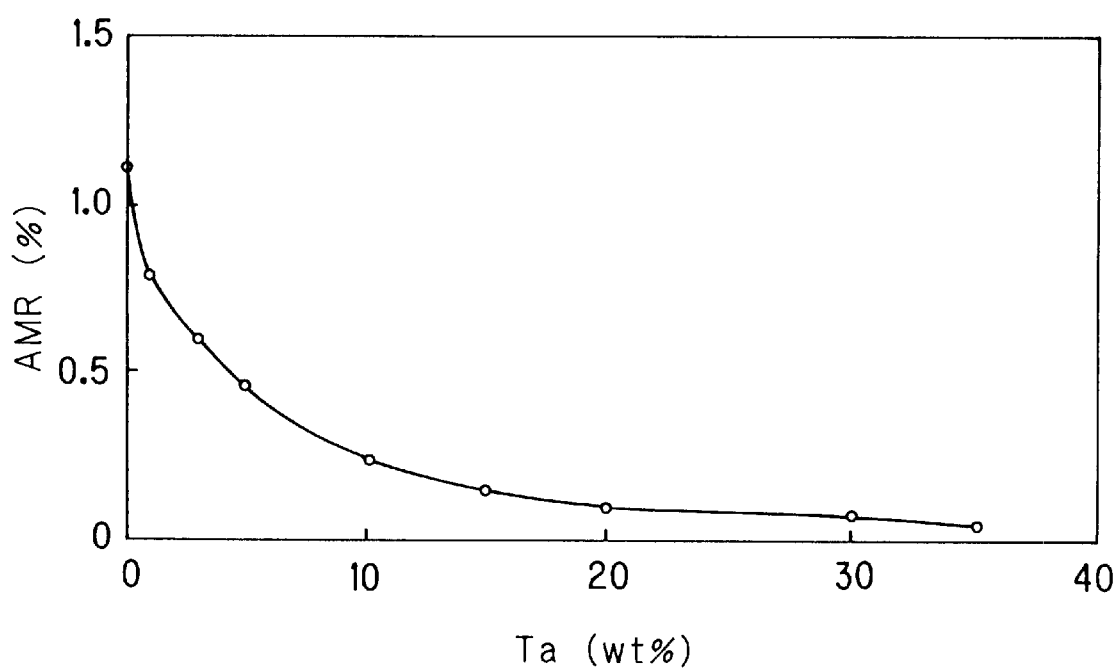
FIG. 11 is a graph showing a relationship between the Ta content in a second soft magnetic layer and the AMR value.

From the results shown in FIG. 11, it is seen that the AMR value was gradually decreased by increasing the percentage content of Ta. The MR curve of a spin valve film using a soft magnetic layer (free layer) with a low AMR value is not liable to receive an influence from the AMR curve (influence is small). Therefore, the linearity of a signal is improved by increasing the percentage content of Ta, thus, the output voltage which is proportional to variation in the magnetic field can be obtained.

EXAMPLE XII

Considering a laminate film structure of Ta(50 Å)/NiFeNb (70 Å;Ni/Fe weight ratio=4.6)/Ta(50 Å) as a basic structure, samples were prepared by changing the percentage content of Nb in the NiFeNb layer (70 Å).

As to these samples, the AMR value was derived as in the foregoing Example XI. A relation between the derived AMR value and the percentage content of Nb was presented in a graph. The results are shown in FIG. 12.

Figure 12:
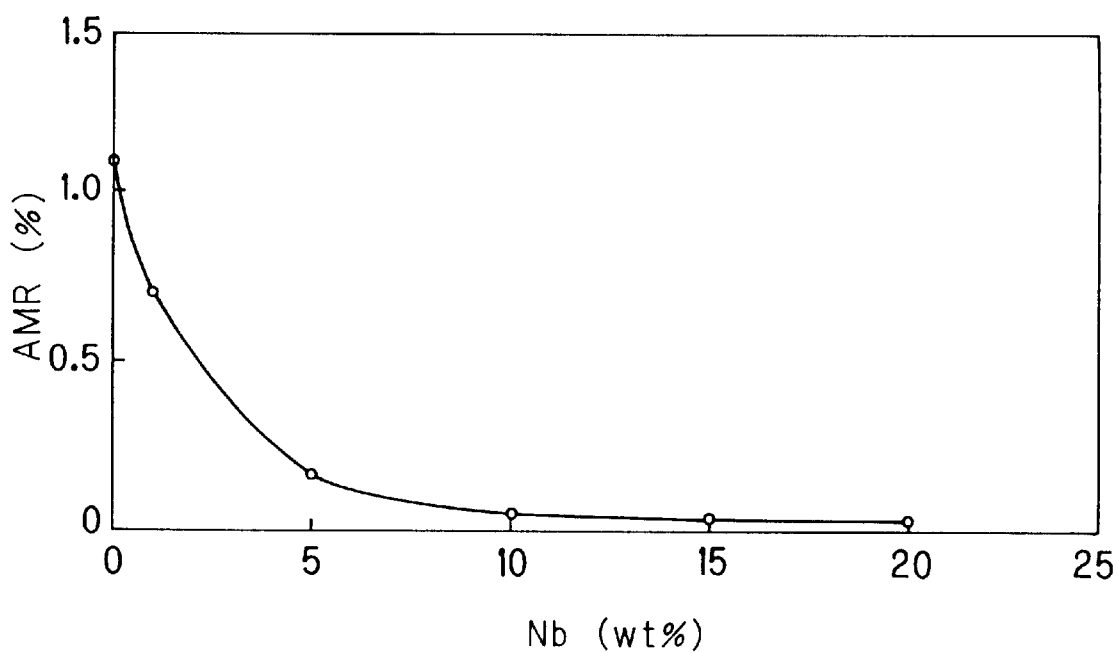
FIG. 12 is a graph showing a relationship between the Nb content in a second soft magnetic layer and the AMR value.

From the results shown in FIG. 12, it is seen that the AMR value was gradually decreased by increasing the percentage content of Nb. The MR curve of a spin valve film using a soft magnetic layer (free layer) with a low AMR value is not liable to receive an influence from the AMR curve (influence is small). Therefore, the linearity of a signal is improved by increasing the percentage content of Nb, thus, the output voltage which is proportional to variation in the magnetic field can be obtained.

EXAMPLE XIII

Figure 13:
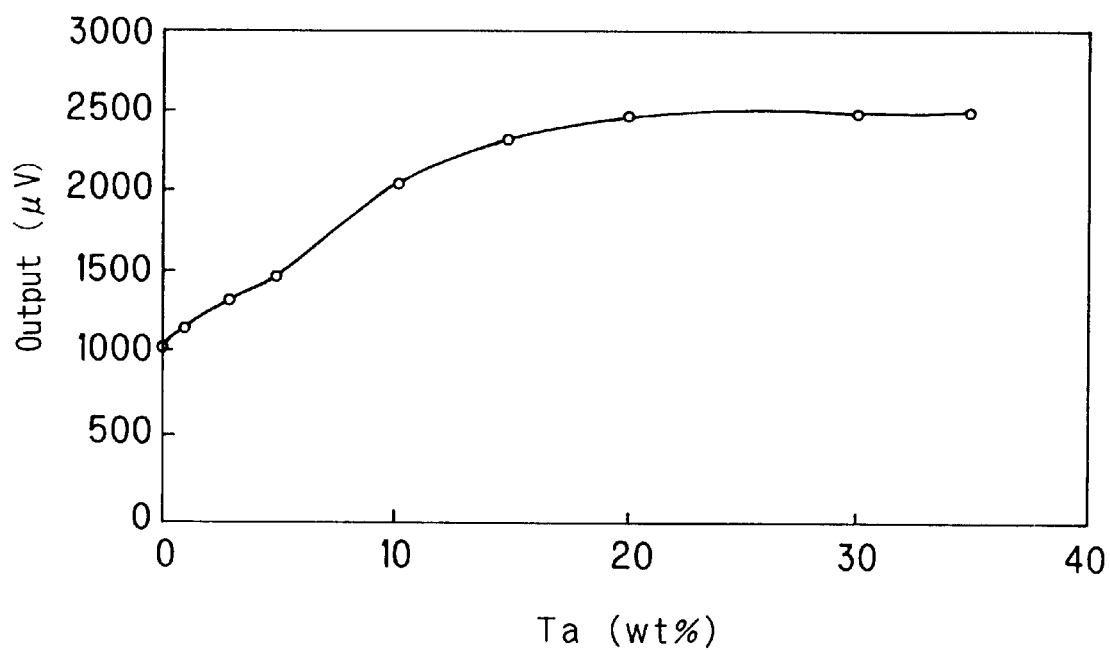
FIG. 13 is a graph showing a relationship between the Ta content in a NiFeTa layer constituting part of a soft magnetic layer, and the magnetic head output.

Each spin valve film prepared in the foregoing Example I was incorporated in a magnetic head, and a relation between the magnetic head output and the percentage content of Ta in the NiFeTa layer, which constitutes a portion of the soft magnetic layer 20, was derived. The results are shown in FIG. 13. From the graph shown in FIG. 13, it is confirmed that the Ta content in the NiFeTa layer greatly contributes in improving the magnetic head output.

In the evaluation of the magnetic head sample, the track width was set to 1 μm, the sense current was set to 5 mA, and the media magnetic field was set to 2700 Oe.

EXAMPLE XIV

Figure 14:
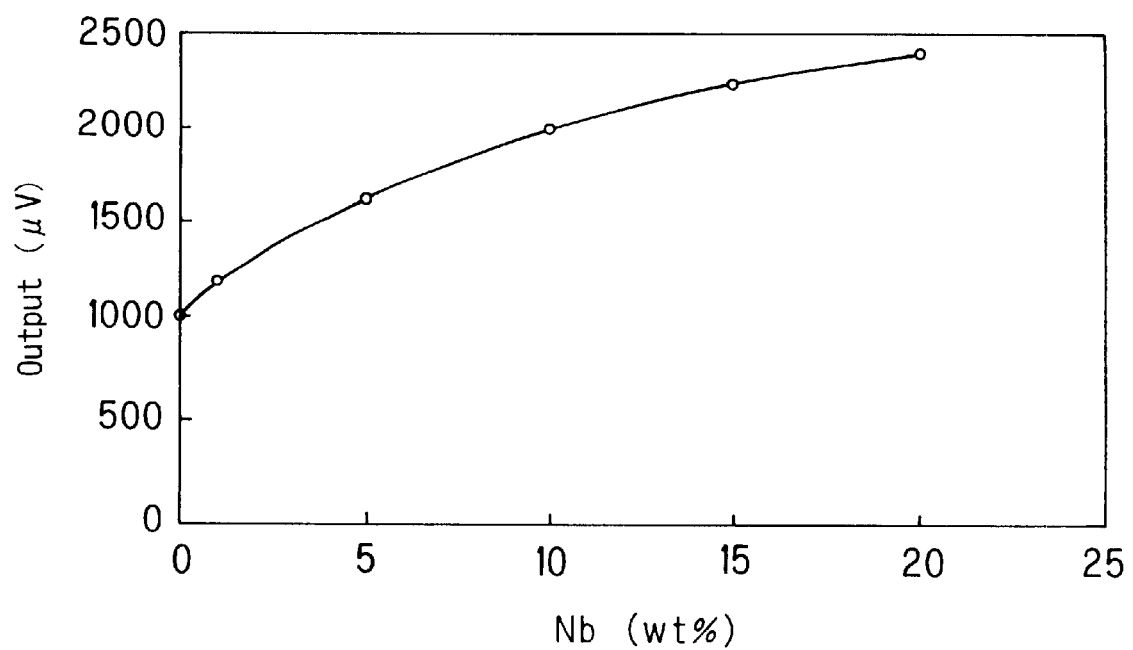
FIG. 14 is a graph showing a relationship between the Nb content in a NiFeTa layer constituting part of a soft magnetic layer and the magnetic head output.

Each spin valve film prepared in the foregoing Example II was incorporated in a magnetic head, and a relation between the magnetic head output and the percentage content of Nb in the NiFeNb layer, which constitutes a portion of the soft magnetic layer 20, was derived. The results are shown in FIG. 14. From the graph shown in FIG. 14, it is confirmed that the Nb content in the NiFeNb greatly contributes in improving the magnetic head output.

In the evaluation of the magnetic head sample, the track width was set to 1 μm, the sense current was set to 5 mA, and the media magnetic field was set to 2700 Oe.

From the foregoing results, the effect of the present invention is clear. Specifically, in the present invention, a soft magnetic layer constituting a spin valve type magnetoresistance effect film comprises a multilayered body having at least two layers and including a first soft magnetic layer substantially made of Co or CoFe, and a second soft magnetic layer substantially made of NiFeX (wherein X represents at least one selected from Ta and Nb) in the order named from the side of a non-magnetic metal layer. More preferably, the soft magnetic layer comprises a multilayered body having at least three layers and including a first soft magnetic layer substantially made of Co or CoFe, a third soft magnetic layer substantially made of NiFe, and a second soft magnetic layer substantially made of NiFeX (wherein X represents at least one selected from Ta and Nb) in the order named from the side of the non-magnetic metal layer. Therefore, the detection sensitivity of a magnetic signal and the output of the magnetic head can be improved. Further, linearity of the derived signal is also excellent.

What is claimed is:

1. A spin valve type magnetoresistance effect film comprising a multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, and wherein said soft magnetic layer comprises a multilayered body having at least two layers and including a first soft magnetic layer substantially made of Co or CoFe, and a second soft magnetic layer substantially made of NiFeTa in the order named from the side of said non-magnetic metal layer, wherein the percentage of Ta in the NiFeTa is set to 1 wt % to 30 wt %.

2. The spin valve type magnetoresistance effect film of claim 1 obtained by a method comprising layering a non-magnetic metal layer, a ferromagnetic layer, a soft magnetic layer, and a pinning layer.

3. The magnetoresistance effect type head according to claim 1, wherein the percentage of Ta in the NiFeTa is set to 3 wt % to 25 wt %.

4. The magnetoresistance effect type head according to claim 1, wherein the percentage of Ta in the NiFeTa is set to 5 wt % to 20 wt %.

5. A spin valve type magnetoresistance effect film comprising a multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, wherein said soft magnetic layer comprises a multilayered body having at least three layers and including a first soft magnetic layer substantially made of Co or CoFe, a third soft magnetic layer substantially made of NiFe, and a second soft magnetic layer substantially made of NiFeTa, and wherein the third soft magnetic layer is between the first soft magnetic layer and the second soft magnetic layer wherein the percentage of Ta in the NiFeTa is set to 1 wt % to 30 wt %.

6. The magnetoresistance effect film according to claim 5, wherein the thickness of said third soft magnetic layer, which constitutes part of said soft magnetic layer and is substantially made of NiFe, is set to 1 Å to 50 Å.

7. The spin valve type magnetoresistance effect film of claim 6 obtained by a method comprising layering a non-magnetic metal layer, a ferromagnetic layer, a soft magnetic layer, and a pinning layer.

8. The magnetoresistance effect type head according to claim 6, wherein the percentage of Ta in the NiFeTa is set to 3 wt % to 25 wt %.

9. The magnetoresistance effect type head according to claim 6, wherein the percentage of Ta in the NiFeTa is set to 5 wt % to 20 wt %.

10. A magnetoresistance effect type head comprising a magnetoresistance effect film and a conductive film, said conductive film being conductively connected to said magnetoresistance effect film, and said magnetoresistance effect film being a spin valve multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, and wherein said soft magnetic layer comprises a multilayered body having at least two layers and including a first soft magnetic layer substantially made of Co or CoFe, and a second soft magnetic layer substantially made of NiFeTa in the order named from the side of said non-magnetic metal layer wherein the percentage of Ta in the NiFeTa is set to 1 wt % to 30 wt %.

11. The spin valve type magnetoresistance effect film of claim 10 obtained by a method comprising layering a non-magnetic metal layer, a ferromagnetic layer, a soft magnetic layer, and a pinning layer.

12. The magnetoresistance effect type head according to claim 10, wherein the percentage of Ta in the NiFeTa is set to 3 wt % to 25 wt %.

13. The magnetoresistance effect type head according to claim 10, wherein the percentage of Ta in the NiFeTa is set to 5 wt % to 20 wt %.

14. A magnetoresistance effect type head comprising a magnetoresistance effect film and a conductive film, said conductive film being conductively connected to said magnetoresistance effect film, and said magnetoresistance effect film being a spin valve multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, wherein said soft magnetic layer comprises a multilayered body having at least three layers and including a first soft magnetic layer substantially made of Co or CoFe, a third soft magnetic layer substantially made of NiFe, and a second soft magnetic layer substantially made of NiFeTa, and wherein the third soft magnetic layer is between the first soft magnetic layer and the second soft magnetic layer wherein the percentage of Ta in the NiFeTa is set to 1 wt % to 30 wt %.

15. The magnetoresistance effect type head according to claim 14, wherein the thickness of said third soft magnetic layer, which constitutes part of said soft magnetic layer and is substantially made of NiFe, is set to 1 Å to 50 Å.

16. The spin valve type magnetoresistance effect film of claim 14 obtained by a method comprising layering a non-magnetic metal layer, a ferromagnetic layer, a soft magnetic layer, and a pinning layer.

17. The magnetoresistance effect type head according to claim 14, wherein the percentage of Ta in the NiFeTa is set to 3 wt % to 25 wt %.

18. The magnetoresistance effect type head according to claim 14, wherein the percentage of Ta in the NiFeTa is set to 5 wt % to 20 wt %.

19. A spin valve type magnetoresistance effect film comprising a multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, wherein said soft magnetic layer comprises a multilayered body having at least two layers and including a first soft magnetic layer substantially made of Co or CoFe, and a second soft magnetic layer substantially made of NiFeNb in the order named from the side of said non-magnetic metal layer, and wherein the percentage of Nb in the NiFeNb is set to 1 wt % to 15 wt %.

20. The magnetoresistance effect film according to claim 19, wherein the percentage of Nb in the NiFeNb is set to 3 wt % to 12 wt %.

21. The magnetoresistance effect film according to claim 19, wherein the percentage of Nb in the NiFeNb is set to 5 wt % to 10 wt %.

22. The spin valve type magnetoresistance effect film of claim 19 obtained by a method comprising layering a non-magnetic metal layer, a ferromagnetic layer, a soft magnetic layer, and a pinning layer.

23. A magnetoresistance effect type head comprising a magnetoresistance effect film and a conductive film, said conductive film being conductively connected to said magnetoresistance effect film, and said magnetoresistance effect film being a spin valve multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, wherein said soft magnetic layer comprises a multilayered body having at least two layers and including a first soft magnetic layer substantially made of Co or CoFe, and a second soft magnetic layer substantially made of NiFeNb in the order named from the side of said non-magnetic metal layer, and wherein the percentage content of Nb in the NiFeNb is set to 1 wt % to 15 wt %.

24. The magnetoresistance effect type head according to claim 23, wherein the percentage of Nb in the NiFeNb is set to 3 wt % to 12 wt %.

25. The magnetoresistance effect type head according to claim 23, wherein the percentage of Nb in the NiFeNb is set to 5 wt % to 10 wt %.

26. The spin valve type magnetoresistance effect film of claim 23 obtained by a method comprising layering a non-magnetic metal layer, a ferromagnetic layer, a soft magnetic layer, and a pinning layer.

27. A spin valve type magnetoresistance effect film comprising a multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, wherein said soft magnetic layer comprises a multilayered body having at least three layers and including a first soft magnetic layer substantially made of Co or CoFe, a third soft magnetic layer substantially made of NiFe, and a second soft magnetic layer substantially made of NiFeNb, and wherein the third soft magnetic layer is between the first soft magnetic layer and the second soft magnetic layer wherein the percentage content of Nb in the NiFeNb is set to 1 wt % to 15 wt %.

28. The magnetoresistance effect film according to claim 27, wherein the percentage of Nb in the NiFeNb is set to 3 wt % to 12 wt %.

29. The magnetoresistance effect film according to claim 27, wherein the percentage of Nb in the NiFeNb is set to 5 wt % to 10 wt %.

30. The spin valve type magnetoresistance effect film of claim 27 obtained by a method comprising layering a non-magnetic metal layer, a ferromagnetic layer, a soft magnetic layer, and a pinning layer.

31. A magnetoresistance effect type head comprising a magnetoresistance effect film and a conductive film, said conductive film being conductively connected to said magnetoresistance effect film, and said magnetoresistance effect film being a spin valve multilayered film including a non-magnetic metal layer, a ferromagnetic layer formed on one surface of said non-magnetic metal layer, a soft magnetic layer formed on the other surface of said non-magnetic metal layer, and a pinning layer which is formed on a surface of said ferromagnetic layer, remote from a surface thereof abutting said non-magnetic metal layer, so as to pin a direction of magnetization of said ferromagnetic layer, wherein said soft magnetic layer is set to freely change its magnetization direction in response to an external magnetic field as magnetic information, wherein said soft magnetic layer comprises a multilayered body having at least three layers and including a first soft magnetic layer substantially made of Co or CoFe, a third soft magnetic layer substantially made of NiFe, and a second soft magnetic layer substantially made of NiFeNb, and wherein the third soft magnetic layer is between the first soft magnetic layer and the second soft magnetic layer wherein the percentage content of Nb in the NiFeNb is set to 1 wt % to 15 wt %.

32. The magnetoresistance effect film according to claim 31, wherein the percentage of Nb in the NiFeNb is set to 3 wt % to 12 wt %.

33. The magnetoresistance effect film according to claim 31, wherein the percentage of Nb in the NiFeNb is set to 5 wt % to 10 wt %.

34. The spin valve type magnetoresistance effect film of claim 31 obtained by a method comprising layering a non-magnetic metal layer, a ferromagnetic layer, a soft magnetic layer, and a pinning layer.

* * * * *